United States Patent [19]

Akashi

[11] Patent Number: 5,679,088
[45] Date of Patent: Oct. 21, 1997

[54] CHANGE GEAR SYSTEM

[76] Inventor: Keiichi Akashi, 30-B-304, Yamadanishi 1-chome, Suita-shi, Osaka-fu, Japan

[21] Appl. No.: 525,189

[22] Filed: Sep. 8, 1995

[51] Int. Cl.$^6$ .................................................. F16H 3/44
[52] U.S. Cl. .................... 475/296; 475/16; 475/170; 475/298; 74/63; 74/390; 74/393; 74/397
[58] Field of Search .............................. 475/16, 162, 169, 475/170, 296, 298, 300; 74/63, 390, 393, 397; 280/259, 260

[56] References Cited

U.S. PATENT DOCUMENTS

| | | |
|---|---|---|
| 3,526,148 | 9/1970 | Charpentier . |
| 4,411,165 | 10/1983 | Evans ........................... 74/63 |
| 4,800,768 | 1/1989 | Kazuta ........................ 475/296 |
| 5,099,706 | 3/1992 | Irvin ............................ 475/162 |

FOREIGN PATENT DOCUMENTS

| | | |
|---|---|---|
| 0058031 | 8/1982 | European Pat. Off. . |
| 0380828 | 8/1990 | European Pat. Off. . |
| 37-005462 | 6/1962 | Japan . |
| 91/10081 | 7/1991 | WIPO . |

*Primary Examiner*—Charles A. Marmor
*Assistant Examiner*—Sherry Lynn Estremsky
*Attorney, Agent, or Firm*—Birch, Stewart, Kolasch & Birch, LLP

[57] ABSTRACT

A change gear system comprises a driven case, a driving shaft and shifting means for shifting the drive shaft, and three sliding frames are provided in alignment in the driven case. Each sliding frame is provided with a pair of rack gears with teeth facing each other and cam surfaces facing each other in parallel with a pitch line of the rack gears. The sliding frames are provided for movement at an angle of 120 (deg.) in different directions perpendicular to the pitch, respectively. The driving shaft is provided with pinions and cam plates. The cam plates are in contact with the cam surfaces, and serve for positioning the sliding frames. The cam plates are configured such that arcs C1 are linked alternatingly with arcs C2.

14 Claims, 28 Drawing Sheets

CHANGE GEAR SYSTEM

BACKGROUND OF THE INVENTION

The present invention relates to a change gear system for changing an input to an output. The change gear system can be preferably employed in a reduction gear system for bicycles.

The present inventor has already suggested a change gear system as described in Japanese Patent Publication No. 37-5462. The change gear system comprises, as shown in FIG. 29, a rotatable driven case (a) and a driving shaft c disposed parallel to a rotational center line cl of the driven case (a). The driving shaft c can be moved by shifting means b in the direction orthogonal to the rotational center line cl of the driven case (a).

The driven case (a) is rotatable about the rotational center line cl. The driven case (a) is provided with two pairs of rails d1, d1 and d2, d2 parallel to each other and facing on opposite sides of the rotational center line cl. Intermediate lines of the rails d1, d2 intersect at an angle of 90 (deg.)

Rectangular sliding frames e, f are movably attached to the rails d1, d2. Two sliding frames e, f are moved in the directions orthogonal to each other. Each of the sliding frames e, f forms an opening g. Inside the opening g, a pair of rack gears h, h and a pair of cam surfaces i, i parallel to a pitch line of the rack gear h are formed in vertical alignment. The rack gears h, h and the cam surfaces i, i are respectively opposed by each other in the moving direction of the slide frames e, f.

The driving shaft c is provided through the opening g. Two pinions j, j engaged with the rack gears h of slide frames, respectively, are securely fixed to the driving shaft c. The pinions j, j cannot simultaneously be engaged with both rack gears h, h facing each other.

The driving shaft c holds an eccentric cam plate k. The cam plate k is inserted to the cam surfaces i, i of the sliding frames e, f. The cam plate k can be simultaneously in contact with the cam surfaces i, i facing each other.

The shifting means b has a sliding plate p moved along a sliding axis o by rotation of a screw shaft m. The sliding plate p rotatably holds the driving shaft c. The cam plate k is fixed to the sliding plate p by means of a pin n. The cam plate k is, thus, prevented from being rotated about the driving shaft c.

The principle of the change gear system for speed change is described below.

An input torque applied to the driving shaft c forces the pinion j to rotate. The pinion j presses the rack gear h engaged therewith in the direction of the pitch line. If a torque caused by the force is higher than that loaded to the driven case (a), the sliding frames e, f can rotate the driven case (a).

The cam plate k is not rotated, but is held in a predetermined position. Therefore, during rotation of the driven case (a), the position of engagement between the rack gear g and pinion j moves along a corresponding pitch circle of virtual internal gear.

Now, the reduction ratio of the change gear system can be expressed as the ratio (PD/RD) of a radius PD of pitch circle of the pinion j to a distance RD from a rotational center of the driven case (a) to the position of engagement between the rack gear h and pinion j. A position of the cam plate k is changed by rotating the screw shaft m in the shifting means b. Accordingly, the distance RD is changed. The reduction ratio is thereby changed.

However, the conventional change gear system has such problems that:

(a) a torque cannot be smoothly transmitted, because irregular rotation tends to be caused;

(b) strong impacts and high torsional moments are caused in the driving shaft, if tooth traces of gears are inconsistent with each other at the beginning of engagement between rack gears and a pinion, causing noises and failure of the system;

(c) no power is picked up from the rotating frame when the driving shaft is stopped;

(d) teeth of the gear can be easily broken off, because a tremendous force is applied in an engagement part between rack gear and a pinion; and (e) it is required to rotate the screw shaft m of shifting means in order to change the reduction ratio.

SUMMARY OF THE INVENTION

A change gear system according to the invention is capable of eliminating all problems listed above.

It is an object of the invention to provide a change gear system capable of eliminating irregular rotations, and allowing a torque to be smoothly transmitted.

It is another object of the invention to provide a change gear system capable of eliminating strong impact and high torsional moment in a driving shaft even if tooth traces of gears are inconsistent with each other at the beginning of engagement between rack gears and a pinion.

It is the other object of the invention to provide a change gear system capable of providing a power from a rotating frame even when a driving shaft is inoperative.

It is a further object of the invention to provide a change gear system capable of preventing teeth of a rack gear and a pinion to be broken.

It is a still further object of the invention to provide a change gear system capable of automatically changing the reduction ratio according to a load to a driven case and an input of input means.

Yet, it is an object of the invention to provide a change gear system preferably employed for bicycles, and preventing frequent gear shifting actions to be taken place even when an input is changed.

Further objects and effects of the invention will be more clearly appreciated from a detailed description below.

According to the invention, a change gear system basically comprises:

a driven case rotatably supported by a stationary member, a driving shaft parallel to a rotational center line of the driven case and shifting means for shifting the driving shaft in the direction perpendicular to the rotational center line, wherein a plurality of rails fixed inside the driven case and a plurality of sliding frames guided by the rails for movement are provided in alignment in the direction of the rotational center line, the sliding frame has an opening for receiving the driving shaft, a pair of parallel rack gears with teeth facing each other and cam surfaces facing each other in parallel with a pitch line of the rack gear, the rails guide the sliding frames in the direction perpendicular to the pitch line of rack gear in a plain perpendicular to the rotational center line, the driving shaft has a plurality of pinions for engagement with the rack gears and cam plates for positioning the sliding frames by coming into contact with the cam surfaces facing each other, the rack gears serve as a virtual internal gear by engagement with the pinions that are rotated, the driven case is rotated about the rotational center line by a torque of the sliding frames that are rotated about the driving shaft, and the reduction ratio is changed by changing a distance from the rotational center line to a position of the engagement by the shifting of the driving shaft, characterized in that:

three or more odd sliding frames are provided, and the moving directions of the sliding frames are intersected by each other at an identical angle;

the cam plate is configured such that small arcs C1 having a radius of curvature R1 and large arcs C2 having a radius of curvature R2 larger than that of the arcs R1 are alternately aligned, and a length H (=R1+R2) of the cam plate configured between two parallel lines is constant; and the cam plate is provided in the driving shaft such that a center of the pinion substantially coincides with that of the arcs C1.

DETAILED DESCRIPTION OF THE INVENTION

Figure 1:
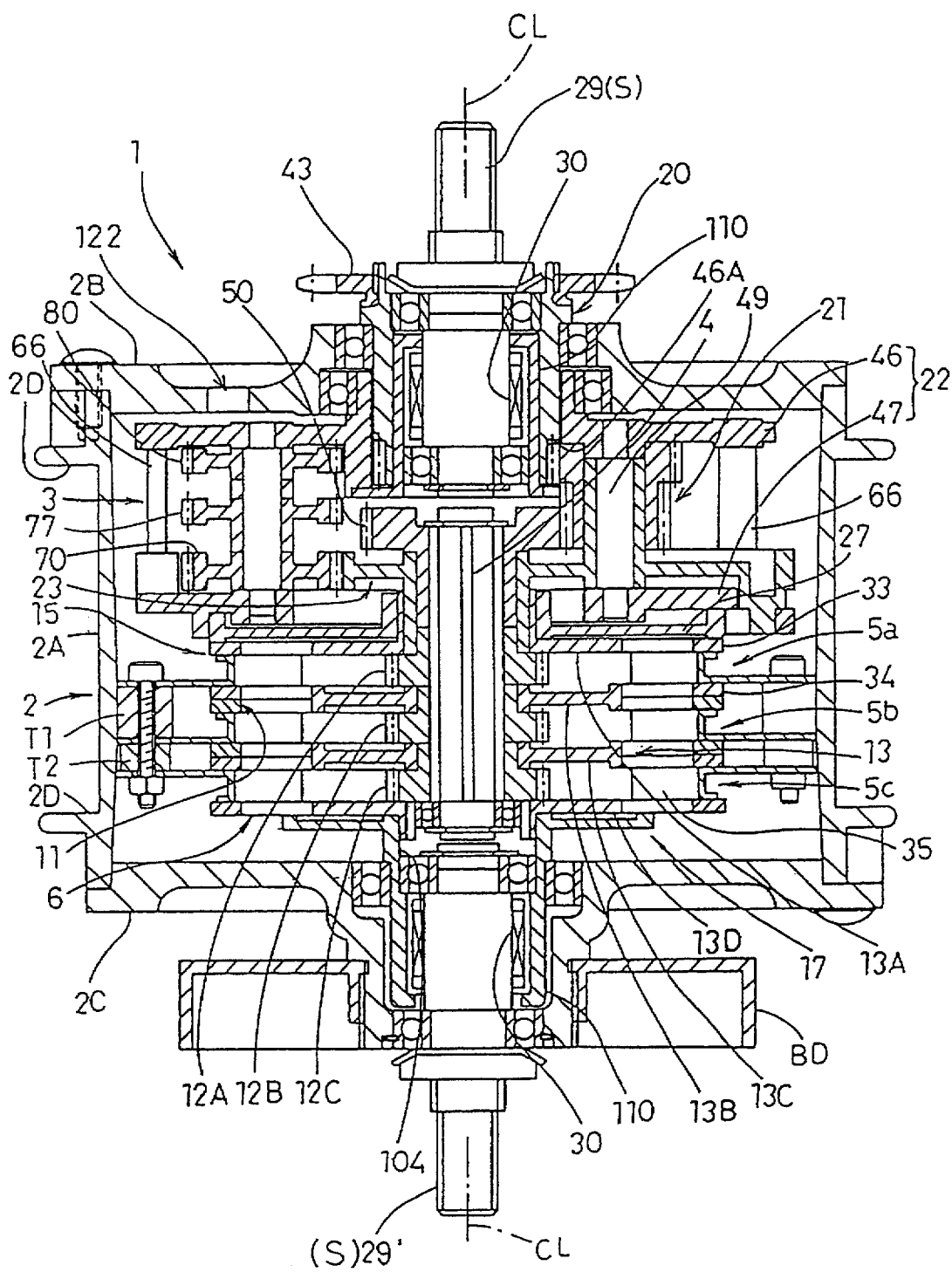
FIG. 1 is a sectional view along a rotational center line of a change gear system according to the invention.

Referring now to the drawings, an embodiment of the invention is described.

A change gear system 1 according to the invention comprises a driven case 2 rotatably supported by a stationary member S, a driving shaft 4 disposed parallel to a rotational center line CL of the driven case 2 and shifting means 3 for shifting the driving shaft 4 in the direction orthogonal to the rotational center line CL.

Figure 22:
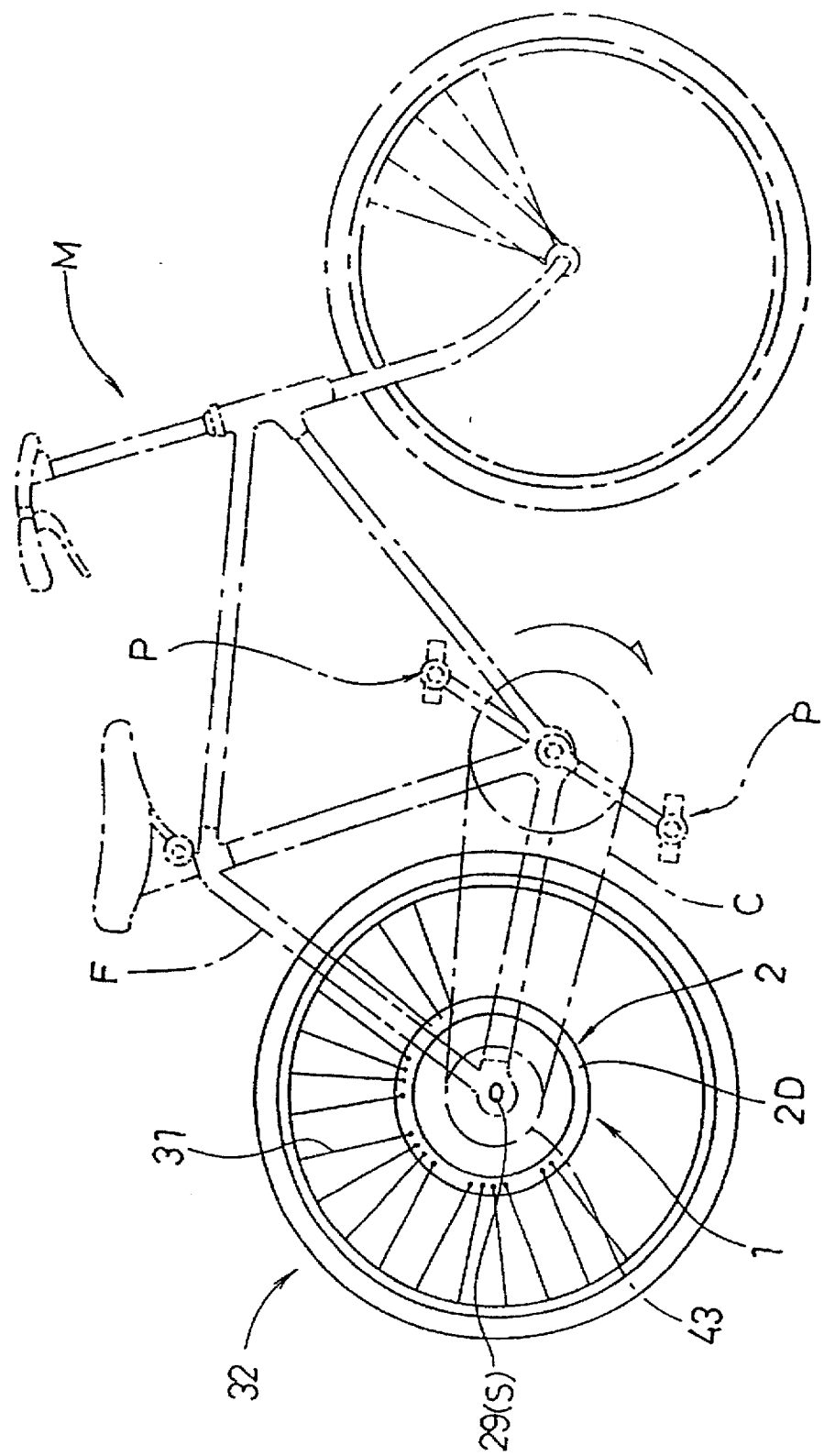
FIG. 22 is a view of a bicycle with a change gear system according to the invention employed therein.

In the embodiment, the stationary member S is a rigid shaft 29 fixed to a body frame F of a bicycle M, as shown in FIG. 22. The driven case 2 is attached integrally with a tire by a spoke 31, and forms part of a rear wheel 32 of the bicycle. Thus, regarding the embodiment, a change gear system (reduction gear system) for bicycles is described. However, the invention is not limited thereto, and is also applicable to a change gear system in such various torque transmission arrangements as those employed in machine tools and vehicles.

For advancing the bicycle M, a torque is applied to a pedal P in the direction of arrow in FIG. 22. Such torque causes to rotate an input cylinder 20 in FIG. 1 clockwise, when it views the change gear system 1 from the side of sprocket 43. In the specification, terms "clockwise" and "counterclockwise" are defined as clockwise and counterclockwise directions when the change gear system 1 is viewed along the rotational center line CL from the side of a sprocket 43, unless otherwise specified.

Figure 2:
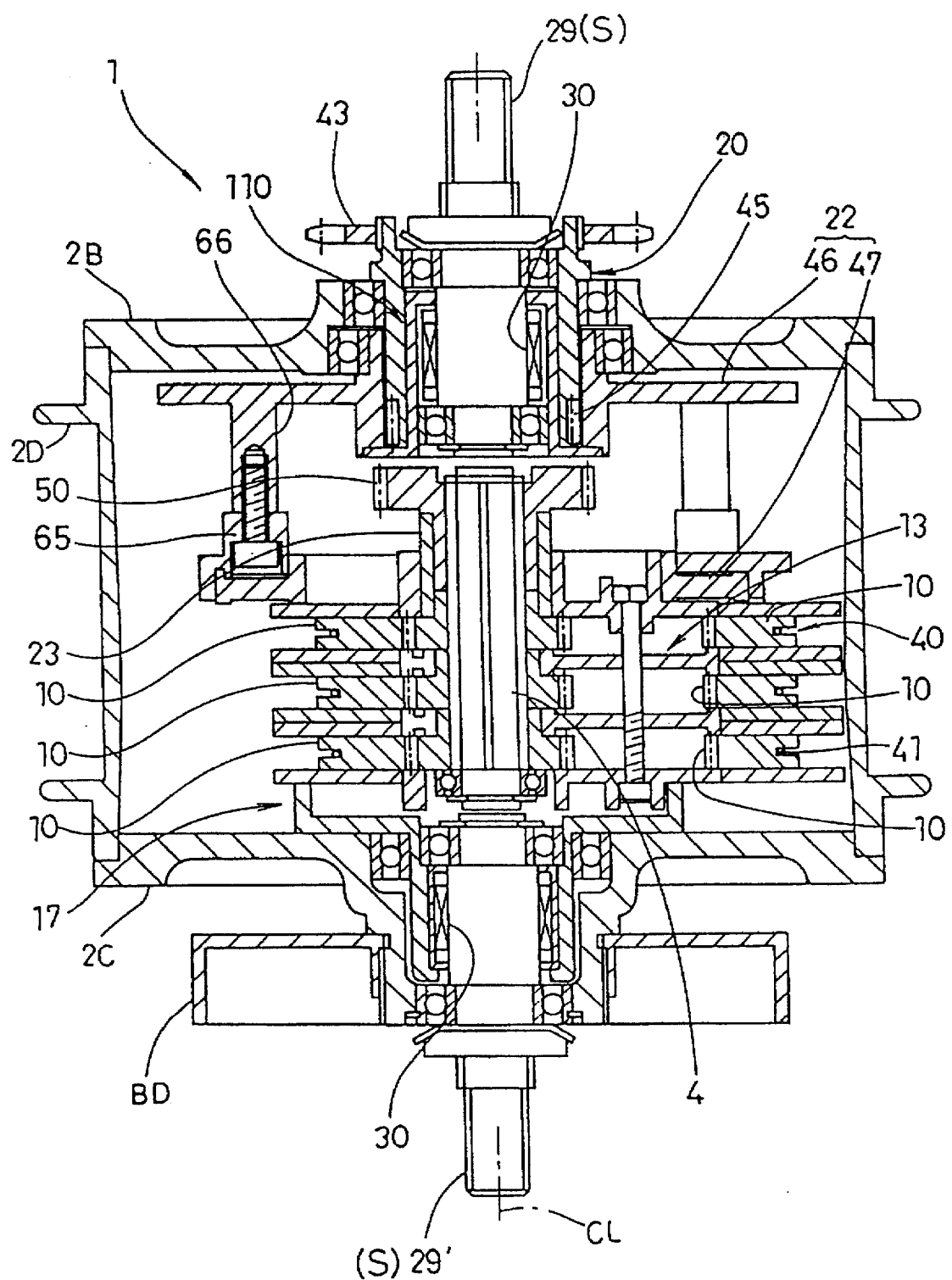
FIG. 2 is a sectional view along a rotational center line of a change gear system according to the invention.

The driven case 2 can be formed, for example, as a closed cylinder, as shown in FIGS. 1 and 2. The driven case 2 comprises a cylinder 2A and covers 2B, 2C fixed in either end of the cylinder 2A. The cylinder 2A is formed with flanges 2D, 2D projecting annularly in either end of an outer circumference thereof. The spoke 31, for example, can be attached to the flange 2D.

The cover 2B is rotatably supported by the rigid shaft 29 through the input cylinder 20. The input cylinder 20 is, in turn, supported rotatably with respect to the rigid shaft 29. The cover 2C is rotatably supported by the other rigid shaft 29'. A brake drum BD of the bicycle, for example, can be fixed to the cover 2C.

The rigid shafts 29, 29' is aligned with each other in an axial center (rotational center line CL). The driven case 2 is, therefore, rotatable only about the rotational center line CL.

Figure 6:
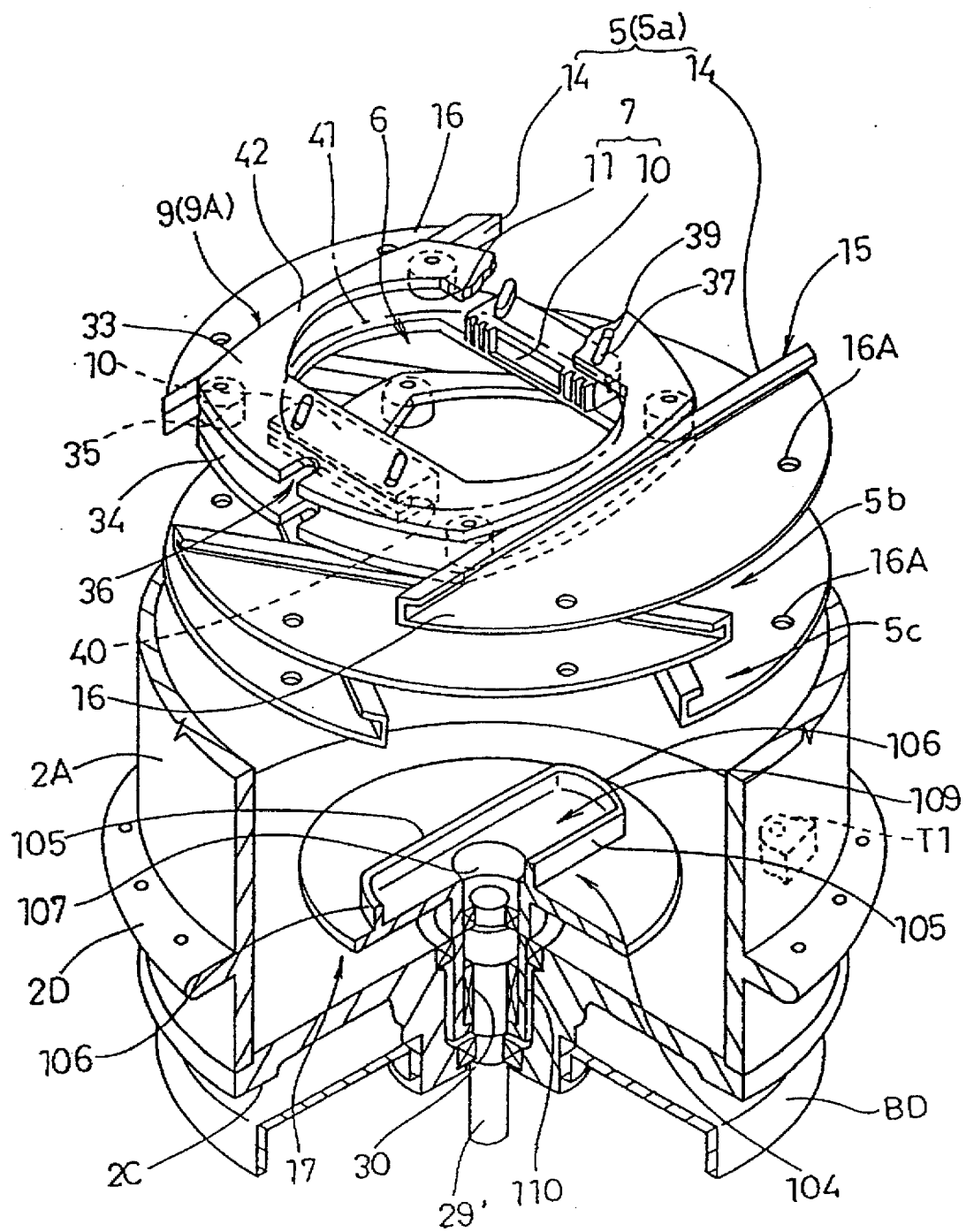
FIG. 6 is an exploded perspective view of rails and a slide frame.

The driven case 2 is provided with a plurality of rails 5a, 5b, 5c as shown in FIGS. 1 and 6. The rails 5a, 5b, 5c can be formed, for example, by disposing rail elements 15, 15 in opposite sides of the rotational center line CL such that they are faced by each other.

The rail elements 15, 15 can be formed each with a rail surface 14 by bending a straight portion of an arcuate member 16. The rail surfaces 14, 14 face with each other in a parallel relationship. The arcuate member 16 preferably has an arc corresponding to an inner circumferential surface of the cylinder 2A, although it is not limited thereto.

Three rails (5a, 5b, 5c) 5 are illustratively aligned in the direction of the rotational center line CL. The rails 5a, 5b, 5c are provided in a plane orthogonal to the rotational center line CL.

The rails 5a, 5b, 5c are positioned such that center lines of the rail surfaces 14, 14 facing each other are intersected by the rotational center line CL. Additionally, the rails 5a, 5b, 5c are arranged such that the center lines are intersected by each other at an identical angle. In the embodiment, the angle of intersection is at 120 (deg.).

The rail elements 15, 15 are fixed to mounts T1 and spacers T2 provided in the inner circumferential surface of cylinder 2A, for example, by means of bolts. The mount T1 and spacer T2 are provided in the inner circumferential surface of cylinder 2A at an identical angular pitch of 60 (deg.).

The rails 5a, 5b, 5c are further provided, in the embodiment, with sliding frames(three in total) 9A, 9B, 9C, respectively. The sliding frames 9A, 9B, 9C are guided by the rails 5a, 5b, 5c, and moved in a plane orthogonal to the rotational center line CL. Thus, the moving direction of the sliding frames 9A, 9B, 9C are intersected with each other at an identical angle of 120 (deg.). The angle refers to a larger one of the angles of intersection.

The sliding frame 9 comprises, for example, rollers 35 provided in four corners between upper and lower frame plates 33, 34. The roller 35 smoothly rolls along the rail surface 14.

The frame plates 33, 34 are formed with an opening 6 for receiving the driving shaft 4. It can be achieved by punching process using a press or the like. Between the frame plates 33, 34, a pair of rack gears 10, 10 facing with each other is provided. The opening 6 forms a pair of cam surfaces 11, 11 parallel to a pitch line of the rack gears 10 in an inner side thereof. The pitch line of rack gear 10 is directed orthogonally to the moving directions of the sliding frames 9A, 9B, 9C.

The rack gear 10 may form, for example, projections 37, 37 extending in the upper and lower directions. The projections 37 are slidably inserted to diagonal grooves 39 in the frame plates 33, 34.

The rack gear 10 forms grooves 40 in opposite sides thereof. A ring spring 41 is circumferentially inserted to the groove 40. Therefore, the rack gears 10, 10 facing each other are constantly forced toward each other. Then, for example, an addendum of the rack gear 10 projects inward the opening 6 beyond the cam surface 11.

In the embodiment, the rack gears 10 are positioned such that the pitch line projects inward 1.5 (mm) from the cam surface 11 when they are in the closest proximity of each other. Of course, the pitch line of rack gears 10 may be in or out of alignment with the cam surface 11, and can be determined according to a relative position between a cam plate 13 and a pinion 12 that will be described later.

The diagonal groove 39 is advantageously inclined such that it is positioned counterclockwise as it moves from the addendum toward dedendum of the rack gear 10. The diagonal groove 39 is preferably inclined at an angle of 60 to 85 (deg.) measured in the side of an acute angle to the pitch line of rack gear 10. In such manner, a clearance of the rack gear 10 at the time of power transmission is minimized. In other words, a power loss of the change gear system is reduced.

The rack gears 10 is released from the pinions 12A, 12B, 12C (shown in FIG. 5) along the diagonal groove 39, in the case an impulsive engagement, failure of intermeshing pitch, jamming or the like is caused between teeth. It means that smooth engagement between the rack gears 10 and pinions 12 is assured.

When the bicycle M goes down a slope, the pedal P may be stopped. In such situation, the pinions 12A, 12B, 12C are stopped. However, the driven case 2 is subjected to a clockwise torque from a tire of the bicycle M.

Even in such case, the rack gears 10 can be smoothly released along the diagonal groove 39 as it comes in contact with the pinion 12 that is immobile. That is, the rack gears 10 function as if they were ratchets, and are avoided from engagement with the pinions 12A, 12B, 12C.

Therefore, strong impacts and high torsional moments are never caused in a driving shaft 4, even if tooth traces of gears are inconsistent with each other at the beginning of engagement between rack gears 10 and pinions 12. Teeth of the gears and pinions can be prevented from being broken. A power is provided from a driven case 2 even when a driving shaft 4 is inoperative.

The frame plates 33, 34 are illustrated with an arc formed in either end thereof in the sliding direction. The arc substantially corresponds to an inner diameter of the cylinder 2A. A notch 36 may be formed in each of the ends. It is preferred in that the sliding frames 9A, 9B, 9C are prevented from being impulsively engaged with the mount T1 in both ends, and a large sliding amount is assured.

The frame plates 33, 34 may be formed, for example, with a bulge 42. The bulge 42 extends beyond the rail surface 14, and vertically covers the rail surface. Such arrangement is preferred in that the sliding frame 9 can be prevented from being removed from the rail 5 as well as displacement.

Figure 5:
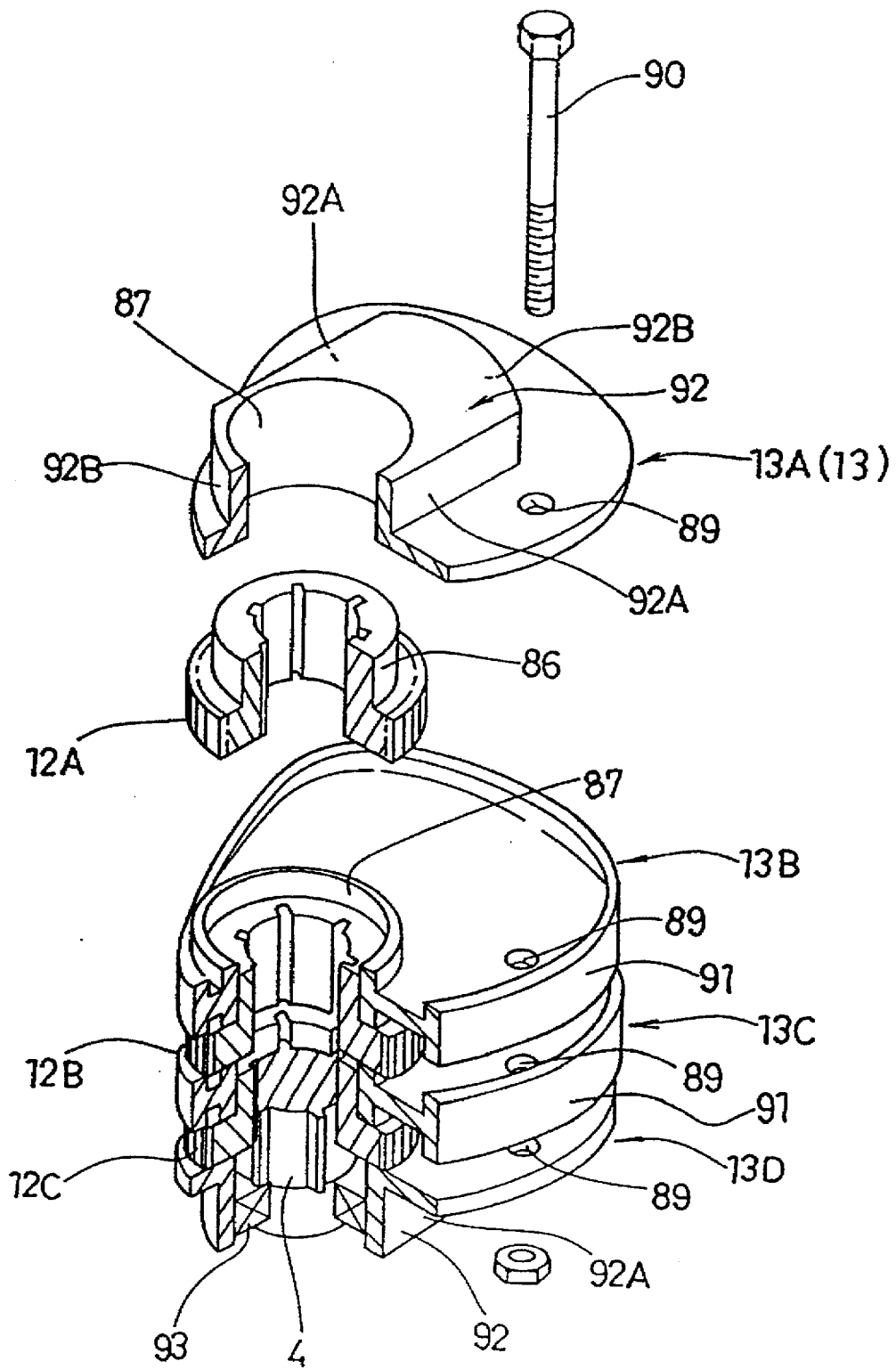
FIG. 5 is an exploded perspective view showing a driving shaft.

The driving shaft 4 may be a spline shaft, for example, as shown in FIGS. 1, 2 and 5. A driving gear 50 and three pinions 12A, 12B and 12C are firmly fixed to the driving shaft 4 in an integrated manner. The pinions 12A, 12B, 12C are dimensioned such that they are engaged with the of the rack gears 10 facing each other without being in contact with the other.

The pinions 12A, 12B, 12C are formed with a boss 86 circular in section, as shown in FIG. 5. The boss 86 is pivotally supported by cam plates 13A, 13B, 13C for rotation. A cam plate 13D is pivotally supported by the driving shaft 4 through a bearing 93.

The cam plates 13 may be attached to the boss 86 by means of a ball bearing. The boss 86 in the pinion may be eliminated so that the pinion 12 can be attached to the driving shaft 4 by means of a bearing. This is preferred for assuring smooth movement of the cam plate.

Figure 11:
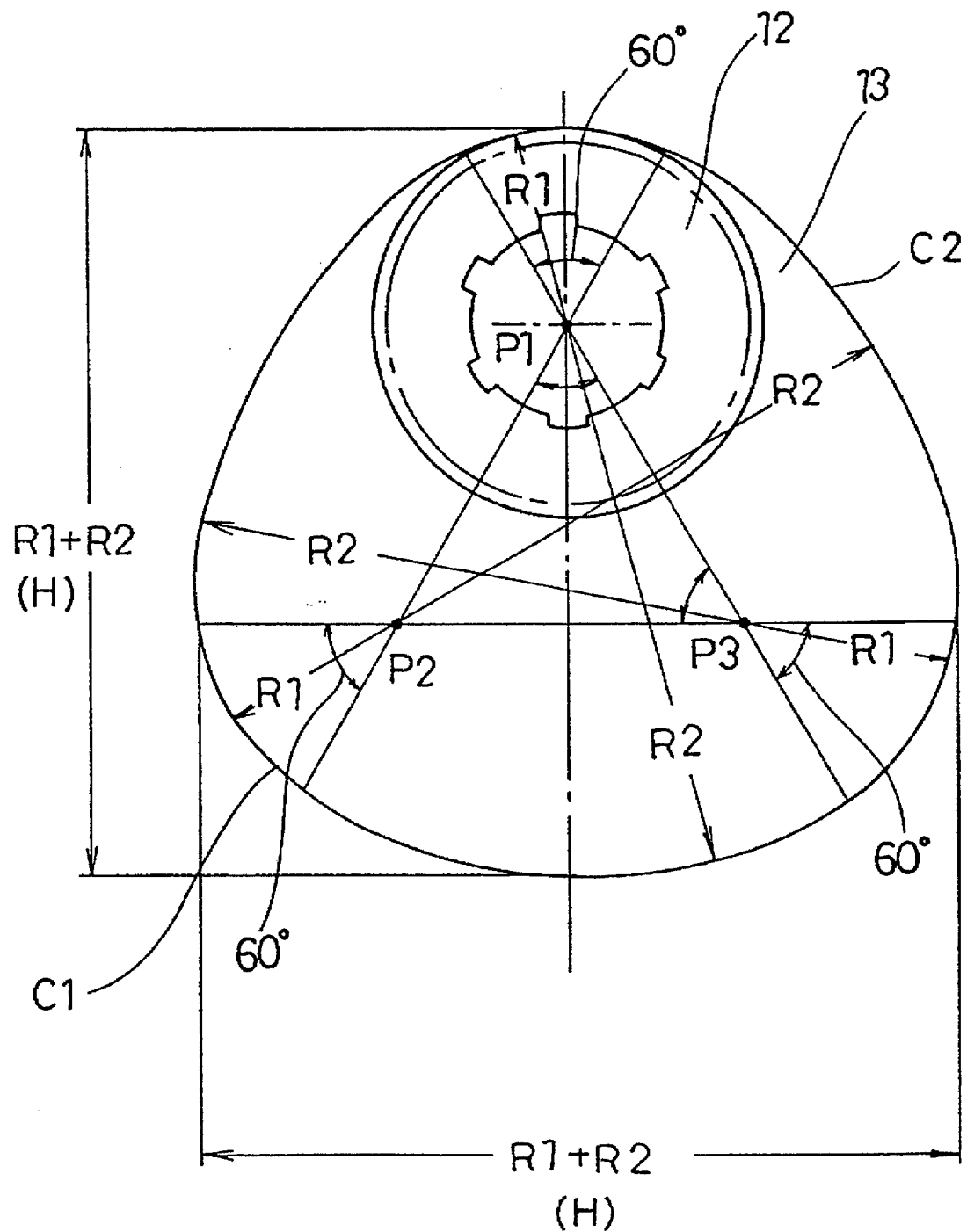
FIG. 11 is a plan view of a cam plate.

The cam plates 13A, 13B, 13C, 13D are shown in FIGS. 5 and 11. As clearly shown in FIG. 11, the cam plate 13 has a configuration, being designed such that a length H (=R1+ R2) between two parallel lines is constant.

Specifications of the cam plate 13 are determined as described below.

As shown in FIG. 11, reference apexes P1, P2, P3 are determined first. The apexes are positioned in a circumference at a constant interval. In this embodiment, the apexes P1, P2, P3 provide vertexes of an equilateral triangle.

Second, from the vertexes of the equilateral triangle (P1-P2-P3), a large arc C2 (a radius of curvature R2) and a small arc C1 (a radius of curvature R1) are drawn at diagonal positions through an angle of 60 (deg.) at the radiuses of curvature R1, R2 (R1<R2; R2 is longer than a side of the equilateral triangle). Then, they are aligned in sequence.

The radius of curvature R1 is approximated to a radius of the pitch circle of the pinion 12. A total length of the radiuses of curvature H (=R1+R2) is consistent with a distance between the cam surfaces 11, 11 facing each other of the sliding frame 9. The radius of curvature R2, for example, is preferably determined 2.7 to 3.0 times of the radius of curvature R1. However, the invention is not limited thereto.

The cam plates 13A, 13B, 13C, 13D is formed, for example, with a shaft hole 87, as shown in FIG. 5. The shaft hole 87 is centered at a vertex of the reference equilateral triangle. The boss 86 of pinions 12A, 12B, 12C is concentrically inserted to the shaft hole 87.

In the embodiment, the pitch circle of pinion 12 attached to the cam plate 13 is positioned 1.5 (mm) inward of the small arc C1 with the radius of curvature R1 of the cam plate. Therefore, as the cam surfaces 11, 11 are guided along the configuration of cam plate 13, and the sliding frame 9 is rotated, the pitch line of rack gear 10 is moved constantly in contact with the pitch line of pinion 12.

In such manner, by determining a relative position such that the pitch lines of pinion 12 and rack gear 10 are in contact when the sliding frame 9 is rotated as it is guided by the cam plate 13, engagement of the gears is advantageously assured, and smoothly achieved. Such effects cannot be realized by a conventional change gear system.

The cam plate 13A rotatably supports the swing arm 23, as shown in FIG. 1. A receptacle cylinder 54 (shown in FIG.3) of the swing arm 23 is inserted to the shaft hole 86 in the cam plate 13A. In this arrangement, a bearing may be provided.

The cam plates 13A, 13B, 13C, 13D as shown in FIG. 5 is provided with an aperture 89 in an identical position, respectively. Thus, the cam plates 13A, 13B, 13C, 13D are firmly fixed in an integrated manner by inserting a bolt 90 to the aperture 89 such that their configurations are aligned with each other.

The cam plates 13A, 13B, 13C, 13D cooperates with the rail 5 to determine a trace of movement of the rack gear 10 with respect to the pinions 12A, 12B, 12C by simultaneously coming into contact with the opposite cam surfaces 11, 11. The sliding frame 9 is thereby capable of moving the rail 5 as the driven case 2 is rotated.

Further, the cam plates 13A and 13D are provided with a bulge 92 extending in the upper and lower directions, respectively. The bulge 92 has flat surfaces 92A, 92A parallel to each other and arcuate surfaces 92B, 92B connecting both ends of the flat surfaces.

It is advantageous to determine a configuration of the cam plates 13 as described above and mounting positions thereof so that the pitch lines of pinion 12 and rack gear 10 are in contact with each other in that:

(a) the number of teeth of engagement between the rack gear 10 and pinion 12 can be increased;

(b) a rotational center of the sliding plate 9 moves sequentially through the vertexes of the equilateral triangle, particularly, when a center of the cam plates 13A, 13B, 13C, 13D is consistent with the rotational center line CL (shown in FIG. 17), a rack gear 10 approaching the pinion 12, out of the pair of rack gears, is reduced in peripheral speed, that is, the rack gear ! 0 is smoothly brought into engagement with the pinion 12; and (c) irregular rotation is reduced.

Now, the shifting means 3 has a rotatable input cylinder 20 (input means), counter gear 21 (torque transmission means), rotating frame 22, swing arm 23 and resistance means 25, as shown in FIGS. 1, 2, 3, 4, 7 and 8.

The input cylinder 20 is, for example, rotatably supported through a bearing by the rigid shaft 29 in the side of an input end thereof. The other end is rotatably attached to a clutch case 110.

Figure 7:
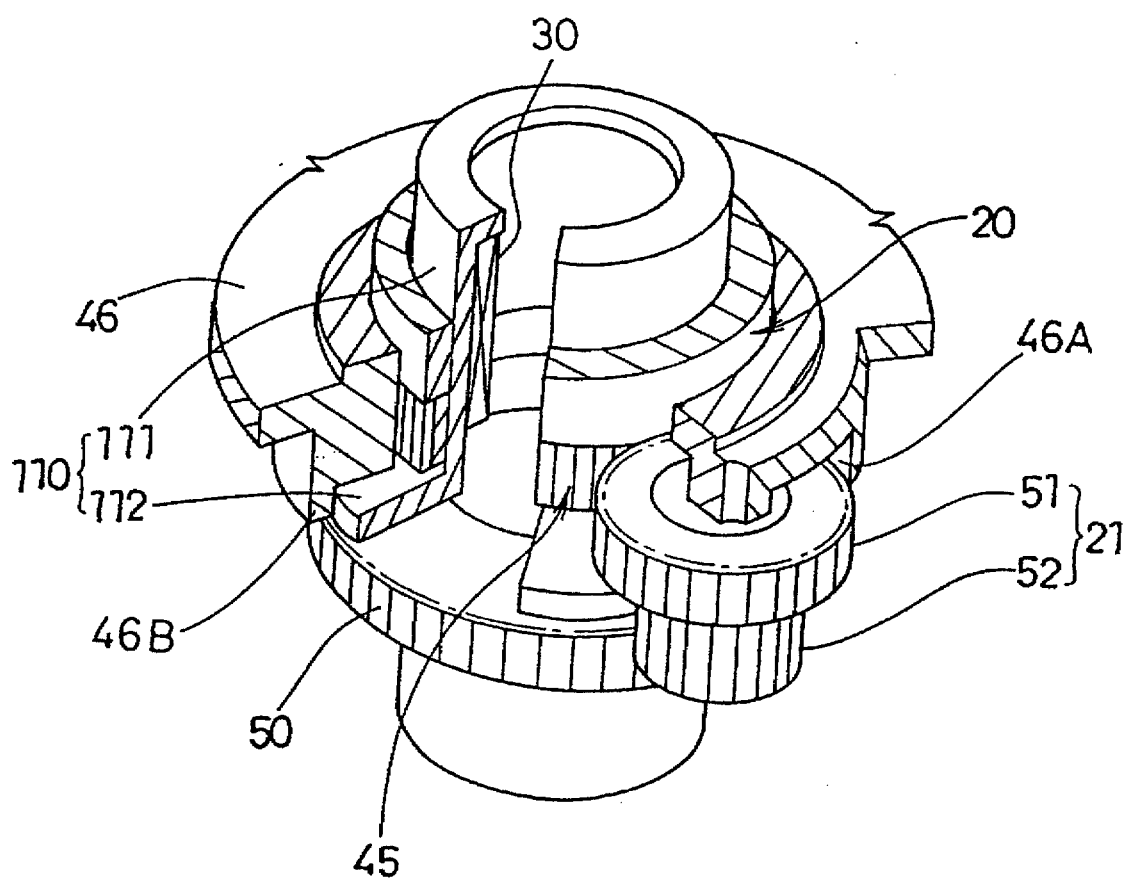
FIG. 7 is a perspective view for describing an input cylinder.

The clutch case 110 comprises, for example, a cylinder 111 and a flange 112, as shown in FIG. 7. The cylinder 111 is attached to the rigid shaft 29 through a one-way engagement clutch 30. In the embodiment, the clutch case 110 is rotatable only in the clockwise direction with respect to the rigid shaft 29. Thus, it cannot be rotated counterclockwise.

The input cylinder 20 has a sprocket 43 attached to an end thereof. The sprocket 43 is exposed to the outside of driven case 2. The sprocket 43 is provided, for example, with a chain C that is rotated by the pedal P of the bicycle as shown in FIG. 22.

The input cylinder 20 is formed with a gear 45 in an end thereof, as shown in FIG. 7. The gear 45 is formed such that it is engaged by the counter gear 21.

The rotating frame 22 is formed by firmly fixing an outer cover 46 and an inner cover 47 to each other in an integrated manner, as shown in FIG. 1. The outer cover 46 is rotatably supported by the cover 2B. A mount 46B (shown in FIG. 7) of the outer cover 46 is fixed to the flange 112 of the clutch case 110.

Therefore, the rotating frame 22 is only rotatable in the clockwise direction. The clockwise rotation of the rotating frame 22 is preferable because it allows the bicycle to advance, and serves for preventing locking in the case of a failure of the change gear system.

Figure 3:
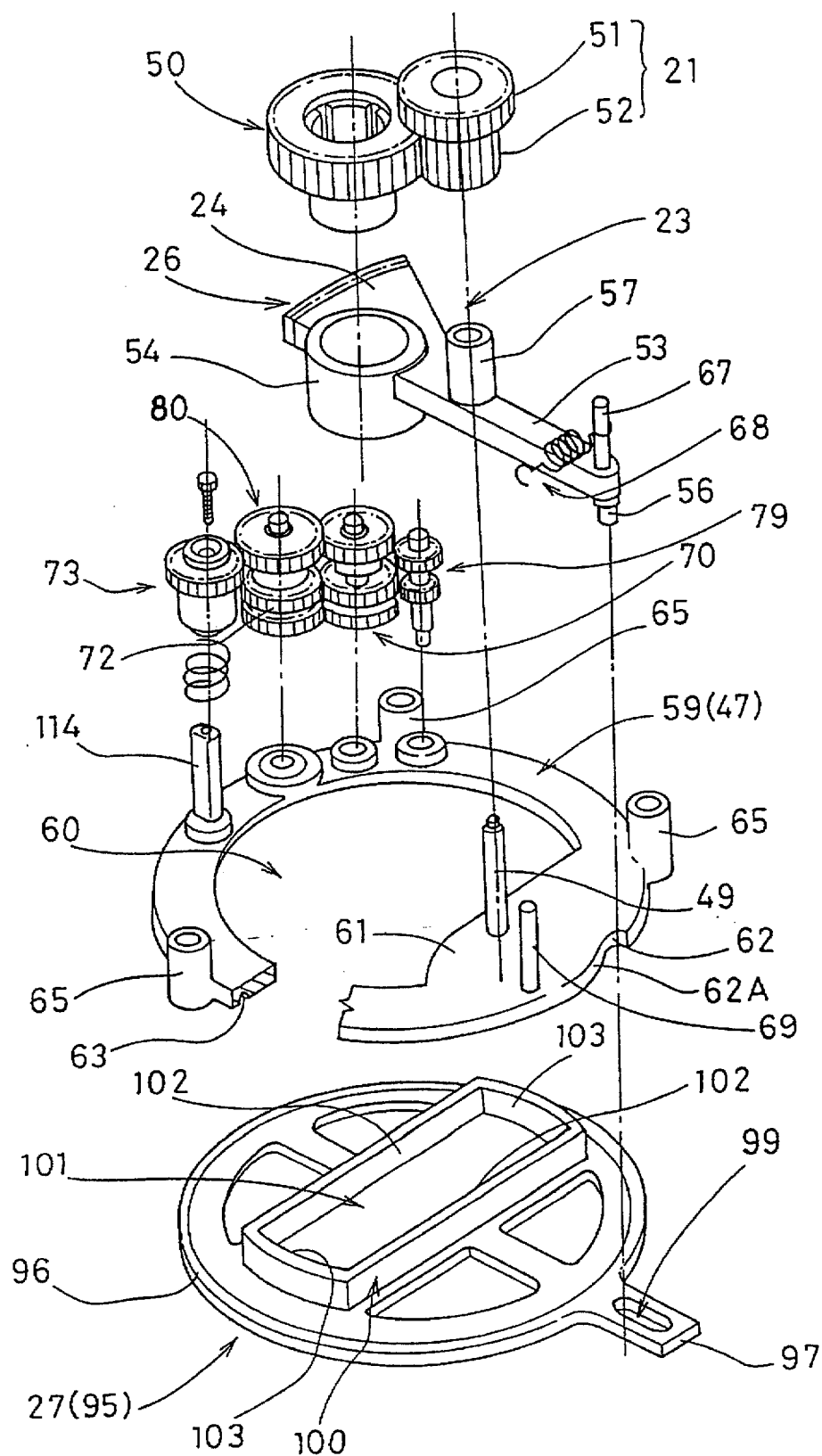
FIG. 3 is an exploded partial perspective view showing a change gear system according to the invention.

The inner cover 47 is formed, for example, as a circular ring 59, as shown in FIG. 3. The inner cover 47 is formed with a circular opening 60 in the inside thereof. The inner cover 47 is also provided with a pin 49 projecting toward the outer cover 46, mounting seats 65 (in three locations), support shaft 69 and the like.

The outer cover 46 is appropriately provided with an aperture for supporting the pin 49, mounting shaft 66 (shown in FIG. 1) inserted to the mounting seat 65 and the like. The inner cover 47 is further provided, as shown in FIG. 3, with a convex portion 61 in the circular opening 60. The convex portion 61 projects inward from an inner circumferential circle of the circular opening 60. An outer circumference of the inner cover 47 is formed with a concave engagement portion 62 having an arcuate surface 62A. The arcuate surface 62A form an arc centered at the pin 49.

Figure 4:
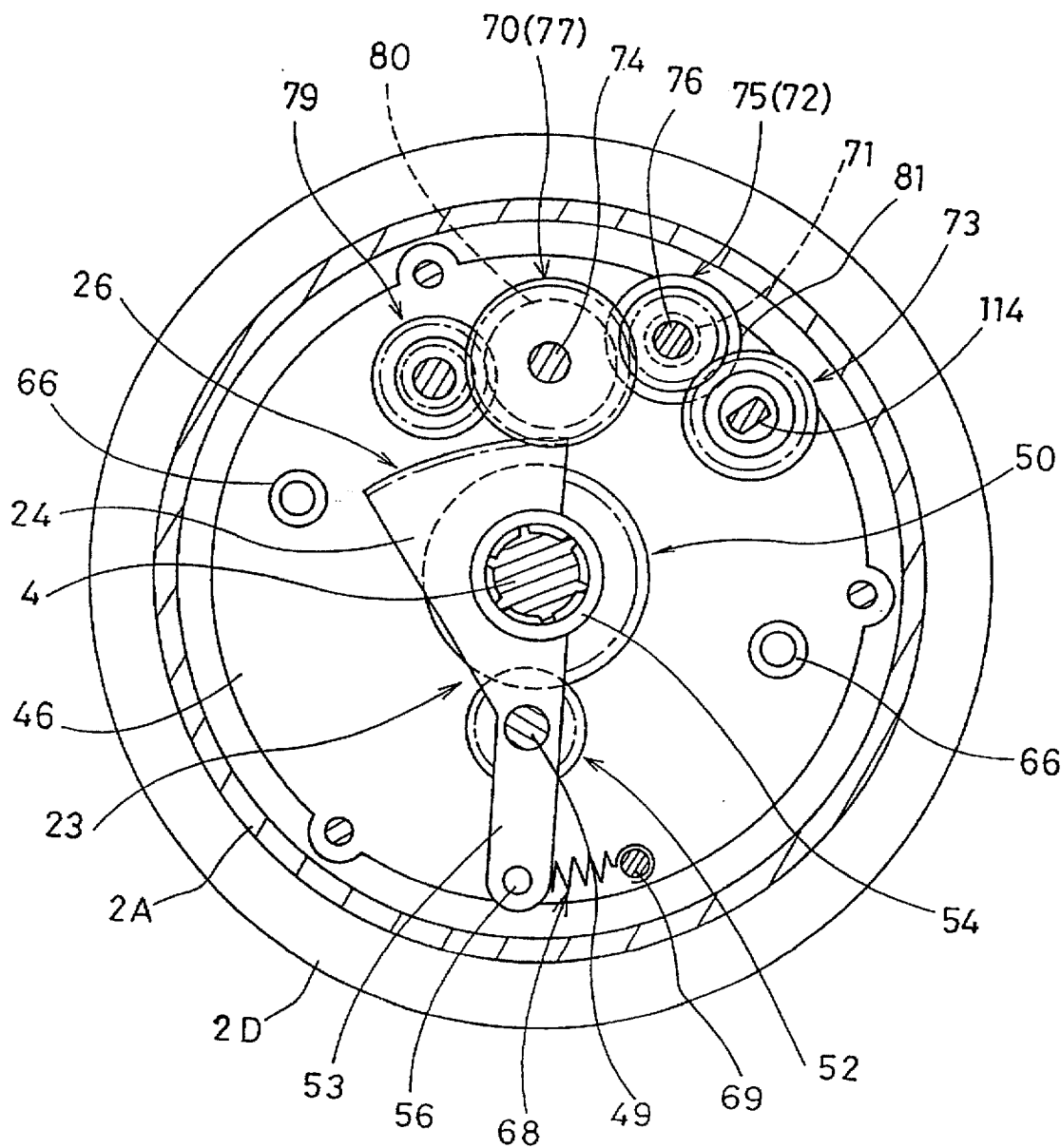
FIG. 4 is a sectional view of a cylinder 2A from the side of a brake drum, taken orthogonally to a rotational center line.

The swing arm 23 has a boss 57 serving as a swing supporting point. The boss 57 is rotatably supported by the pin 49 in the inner cover 47. In an end of the boss 57, an arm member 53 is formed. FIG. 4 is a section of the cylinder 2A viewed from a side of the brake drum BD.

An engagement pin 56 is formed in an end of the arm member 53, and projects toward the inner cover 47. A support pin 67, for example, is also provided in an end of the arm member 53, and projects toward the outer cover 46.

The engagement pin 56 moves along the arcuate surface 62A, and engages with the concave engagement portion 62.

Then, a swing-separating motion (described later) of the swing arm 23 is discontinued. The engagement pin 56 of the swing arm 23 is inserted to a slot 99 in a supplemental plate 27, as shown in FIG. 3.

The support pin 67 supports an end of a spring 68 with a low spring constant. The other end of the spring 68 is supported by the support shaft 69. Therefore, when the swing arm 23 is rotated counterclockwise about the boss 57 as a supporting point, the spring 68 is elongated, and provides a low restoring force. The spring 68 may be eliminated.

In the other end of the boss 57, a segmental member 24 formed with a gear portion 26 in an end thereof is provided. The segmental member 24 forms the receptacle cylinder 54. The receptacle cylinder rotatably supports the driving shaft 4.

The gear portion 26 is formed by a pitch circle centered about the boss 57. The boss 57 and receptacle cylinder 54 have an axial center parallel to the rotational center line CL. The driving shaft 4 is, therefore, placed in parallel with the rotational center line CL of the driven case 2.

The supplemental plate 27 provides, for example, an annular member 95 rotating concentrically with the inner cover 47. The supplemental plate 27 allows an annular projection 96 provided in a circumference thereof to be guided by an annular groove 63 in the inner cover 47. The slot 99 is formed in a bump member 97.

The supplemental plate 27 is provided with a guide frame 100 formed with a substantially rectangular opening 101. The guide frame 100 comprises guide members 102 parallel with each other and arcuate members 103 connecting opposite ends of the guide members.

A maximum dimension of the arcuate members 103, 103 in an outer surface thereof is such that they can be inserted to the circular opening 60 in the inner cover 47. In the embodiment, the maximum dimension of the arcuate members 103, 103 generally corresponds with a diameter of the circular opening 60.

Thus, the supplemental plate 27 is guided by the circular opening 60, and smoothly rotates concentrically with the rotating frame 22. The guide members 102, 102 can also guide the bulge 92 (shown in FIG. 5) of the cam plate 13A.

In detail, the flat surfaces 92A, 92A of bulge 92 between the guide members 102, 102 of the supplemental plate 27. Therefore, the driving shaft 4 is slidable along the guide member 102 within a predetermined range.

The bulge 92 of the cam plate 13D is movably supported by a guide frame 104 of mounting plate 17 as shown in FIG. 7. The mounting plate 17 is pivotally supported for rotation with respect to the cover 2C. However, similarly to the rotating frame 22, the mounting plate 17 is prevented from being rotated counterclockwise by a one-way engagement clutch 30.

The guide frame 104 of mounting plate 17 comprises guide members 105 parallel to each other and arcuate members 106 connecting opposite ends of the guide members. The guide frame 104 is formed with a cavity 109 in the inside thereof, and slidably supports the bulge 92 of cam plate 13D.

The bulge 92 of cam plate 13A is supported by a guide frame 101 of the supplemental plate 27. The bulge 92 of cam plate 13D is supported by the guide frame 104 of mounting plate 17. Because of the guide frames 101 104, the driving shaft 4 is movable perpendicularly to the rotational center line CL of the driven case 2. The movement is brought about by a swinging motion of the swing arm 23 (described later).

The counter gear 21 transmits a torque between the input cylinder 20 and the driving shaft 4. The counter gear 21 is rotatably supported, for example, between the outer and inner covers 46 and 47 by the pin 49 as shown in FIG. 1. The counter gear 21 is formed integrally with a first gear portion 51 and a second gear portion 52, as shown in FIGS. 3 and 7.

The first gear portion 51 is engaged with the gear 45 of input cylinder 20 (see FIG. 7). The outer cover 46 is formed with a notch 46A for the engagement. The second gear portion 52 is engaged with driving gear 50 of driving shaft 4.

Figure 8:
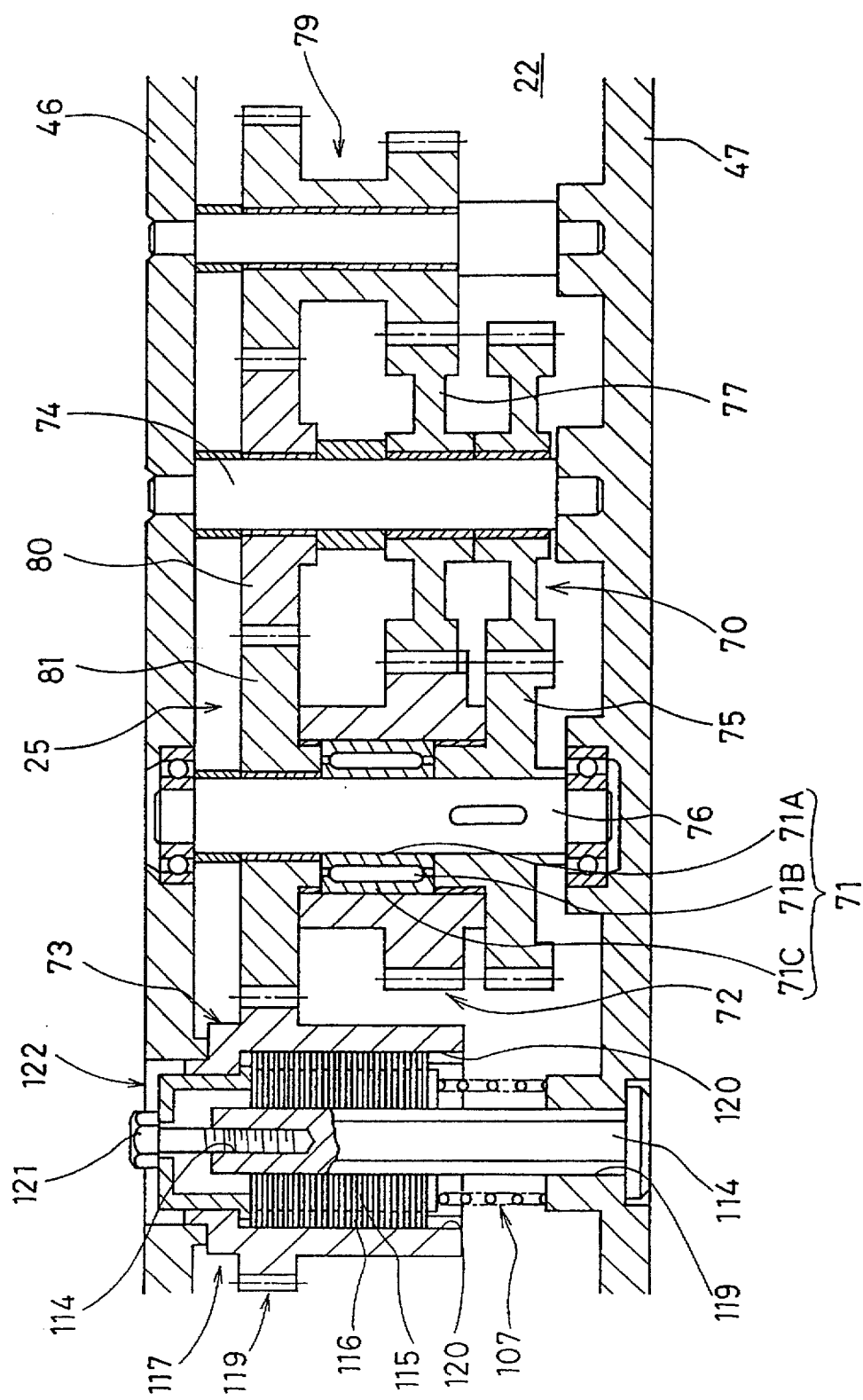
FIG. 8 is a sectional view of resistance means.
Figure 10:
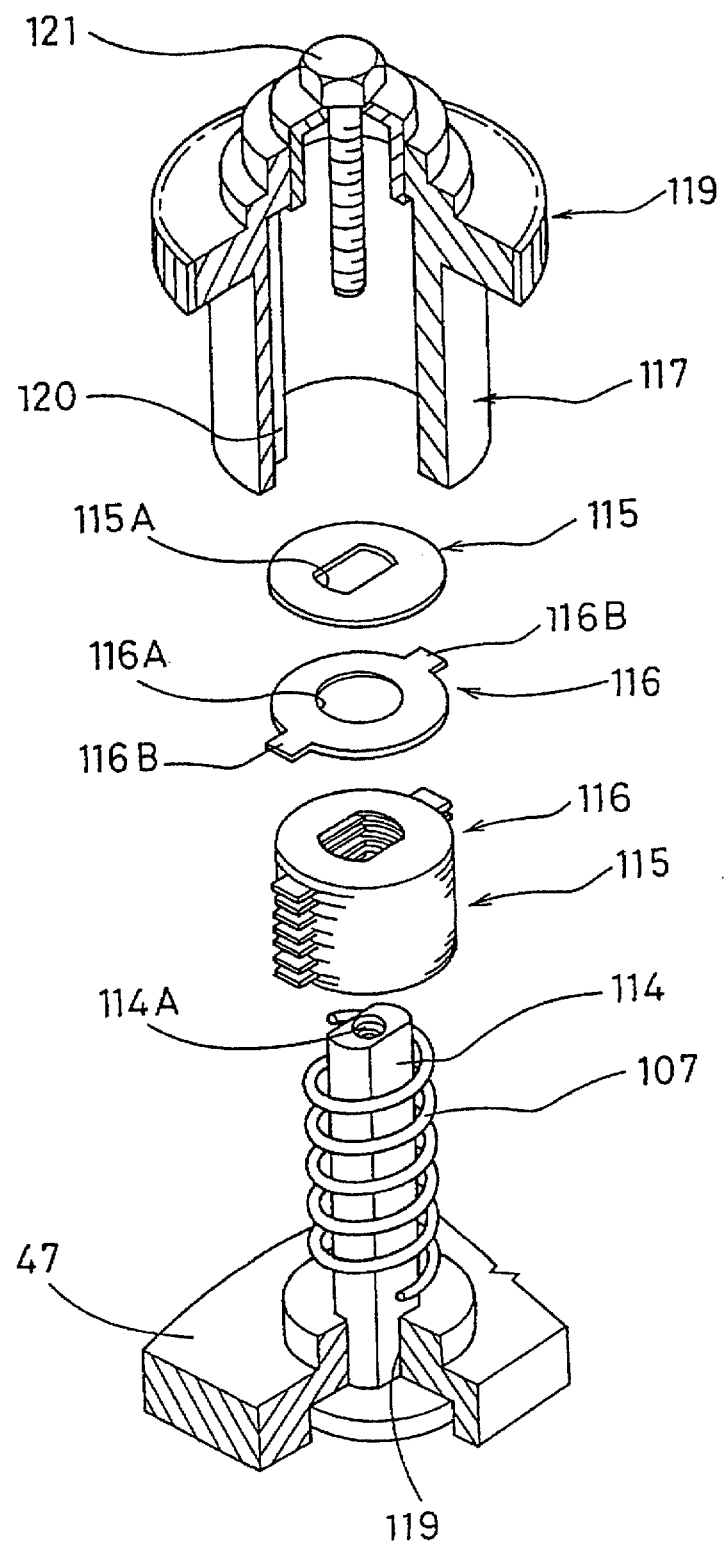
FIG. 10 is an exploded perspective view showing an example of a friction clutch.

The resistance means 25 has a first rotational member 70, a one-way cam 71, a second rotational member 72 and a friction clutch 73, as shown in FIGS. 3, 8 and 10, and is provided, for example, in the rotating frame The first rotational member 70 comprises, for example, a gear engaging with the gear portion 26 in the swing arm, as shown in FIG. 4. It is, therefore, rotated by a swinging motion of the swing arm 23. The first rotational member 70 is provided in a shaft 74 by means of a bush or the like for free rotation, as shown in FIG. 8. Additional, the first rotational member 70 is engaged with a gear 75. The gear 75 is integrated with a rotating shaft 76 by keying or the like.

The rotational members may be replaced with a torque transmission mechanism comprising in combination of a belt, chain, grooved pulley, sprocket and the like.

The second rotational member 72 is a gear subjected to a torque of the first rotational member 70 through a unidirectionally rotating cam 71. The second rotational member 72 is attached to the rotating shaft 76 by means of the unidirectionally rotating cam 71.

The unidirectionally rotating cam 71 is illustrated with a cam 71B placed between inner and outer wheels 71A and 71C. However, it is not limited thereto, and the cam can be directly provided in the rotating shaft. In the embodiment, the unidirectionally rotating cam 71 transmits only a counterclockwise torque of the rotating shaft 76 to the second rotational member 72.

Thus, a clockwise torque of the rotating shaft 76 is not transmitted to the second rotational member 72, leaving the rotating shaft 76 to run idle. It means that only a torque of the first rotational member 70 caused by swing-separating motion (described later) of the swing arm is transmitted to the second rotational member 72.

The second rotational member 72 is engaged with a gear train for increasing a rotating speed of the first rotational member 70. A final stage of the gear train is linked with the friction clutch 73.

The gear train comprises a gear 77 coaxial with the first rotational member 70, idle gear 79 with upper and lower gears formed integrally therewith, gear 80 supported coaxially with the gear 77 and gear 81 (final gear) rotatably supported by the second rotational member 72. The gear train is capable of amplifying even a slight swinging motion of the swing arm 23, and transmitting it to the friction clutch 73. The gear train may be omitted, or appropriately modified by changing the number of stages and the like.

The friction clutch 73 is illustrated as a dry clutch comprising, for example, a rigid shaft 114, two types of friction plates 115, 116 and a rotational case 117, as shown in FIGS. 8 and 10.

The rigid shaft 114 is, for example, non-circular in section. The rigid shaft 114 is inserted to a retaining hole 119. The retaining hole 119 is formed to be generally identical in section to the rigid shaft 114. Therefore, the rigid shaft 114 is retained against rotation. The rigid shaft 114 is formed with a bolt hole 114A.

Two types of friction plates 115, 116 are alternatively inserted to the rigid shaft 114 by means of a spring 107. The friction plate is formed by using a plurality of stationary friction plates 115 and rotating friction plates 116, respectively.

The stationary friction plates 115 has an opening 115A identical in shape with a section of the rigid shaft 114. Thus, the stationary friction plate 115 is prevented from being rotated with respect to the rigid shaft 114.

The rotating friction plate 116 has a circular opening 116A so that it can be rotated with respect to the rigid shaft 114. Projections 116B, 116B are formed in opposite sides of the rotating friction plate 116.

The rotational case 117 has a gear portion 119. The gear portion 119 is engaged with the final gear 81 of the gear train. The rotational case 117 is also formed with two grooves 120, 120 extending the axially at inner surface for receiving the projections 116B. The rotating friction plates 116 is, therefore, integrated with the rotational case 117.

The rotational case 117 can be attached to the rigid shaft 114 by means of a bolt 121. The stationary friction plate 115 and rotating friction plate 116 are tightly forced against each other by the spring 107 and the rotational case 117. Operation of the friction clutch 73 is described below.

A torque applied to the gear portion 119 forces the rotational case 117 to rotate together with the rotating friction plate 116. However, the rotating friction plate 116 cannot be easily rotated because of a frictional force between the stationary friction plate 115 and itself.

In the case the input is lower than the frictional force, the rotational case 117 is maintained in a stationary condition. In other words, the friction clutch 73 serves as a resistance against the input. If the input exceeds the frictional force, two types of friction plates 115, 116 start slipping against each other, and the rotational case 117 is rotated with respect to the rigid shaft 114.

The frictional force can be varied by adjusting an extent of tightening the bolt 121. For this purpose, an adjustment hole 122 is provided in the outer cover 46 and the cover 2B as well. Therefore, a resistance(frictional) force can be adjusted as desired, and adjustment can be easily conducted. The adjustment hole 122 formed in the cover 2B is normally closed by a cap or the like for sealing the driven case 2.

Figure 9:
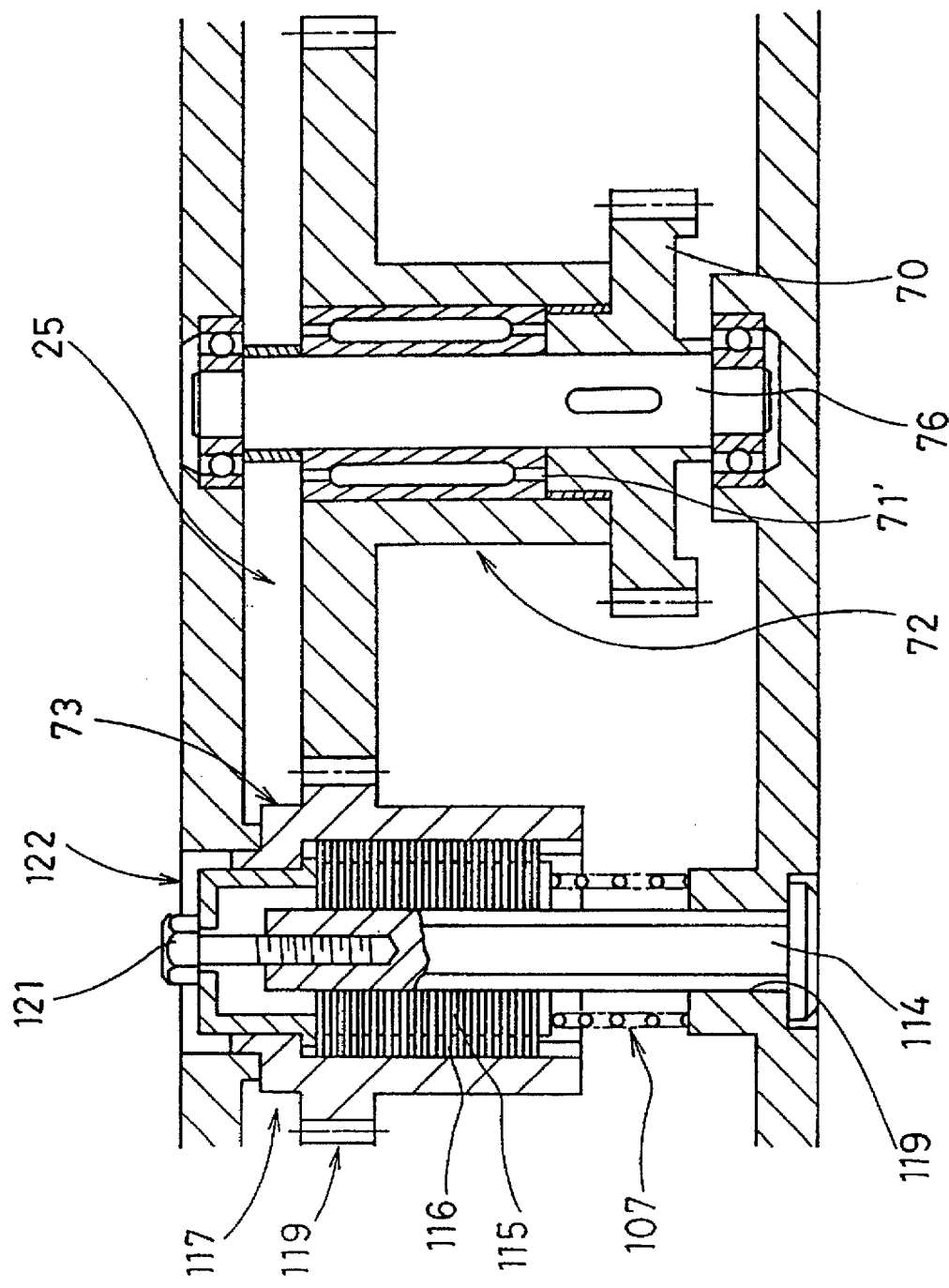
FIG. 9 is a sectional view showing another example of resistance means.

In FIG. 9, another embodiment of the resistance means 25 is shown. In the embodiment, a first rotational member 70 comprises a gear directly engaged with a gear portion 26 of swing arm 23. The first rotational member 70 is rotated in integration with a rotating shaft 76.

A second rotational member 72 comprises a gear attached to the rotating shaft 76 by means of a unidirectionally rotating cam 71'. The gear of second rotational member 72 is engaged directly with a gear portion 119 of friction clutch 73.

The unidirectionally rotating cam 71' is capable of transmitting only a clockwise torque of the rotating shaft 76 to the second rotational member 72. The unidirectionally rotating cam 71' is incapable of transmitting a counterclockwise torque of the rotating shaft 76 to the second rotational member 72. Thus, it is directed reversely to that of the first embodiment.

In the embodiment, an additional gear train for increasing a rotating speed of the first rotational member 70 is not provided. Therefore, the gear of second rotational member 72 is adapted to have a pitch circle larger than that of the gear portion 119 of friction clutch 73, and serves for acceleration. In the embodiment, because no gear train is employed for acceleration, reduction in size and cost and simplification in structure of a system can be achieved.

The friction clutch 73 may be a single plate type, in the case of a dry clutch, and a friction surface may be changed to a conical surface and the like. Alternatively to such dry clutch, a wet clutch may be also employed.

Now, operation of the change gear system 1 constructed in such manner according to the invention is described.

Figure 12:
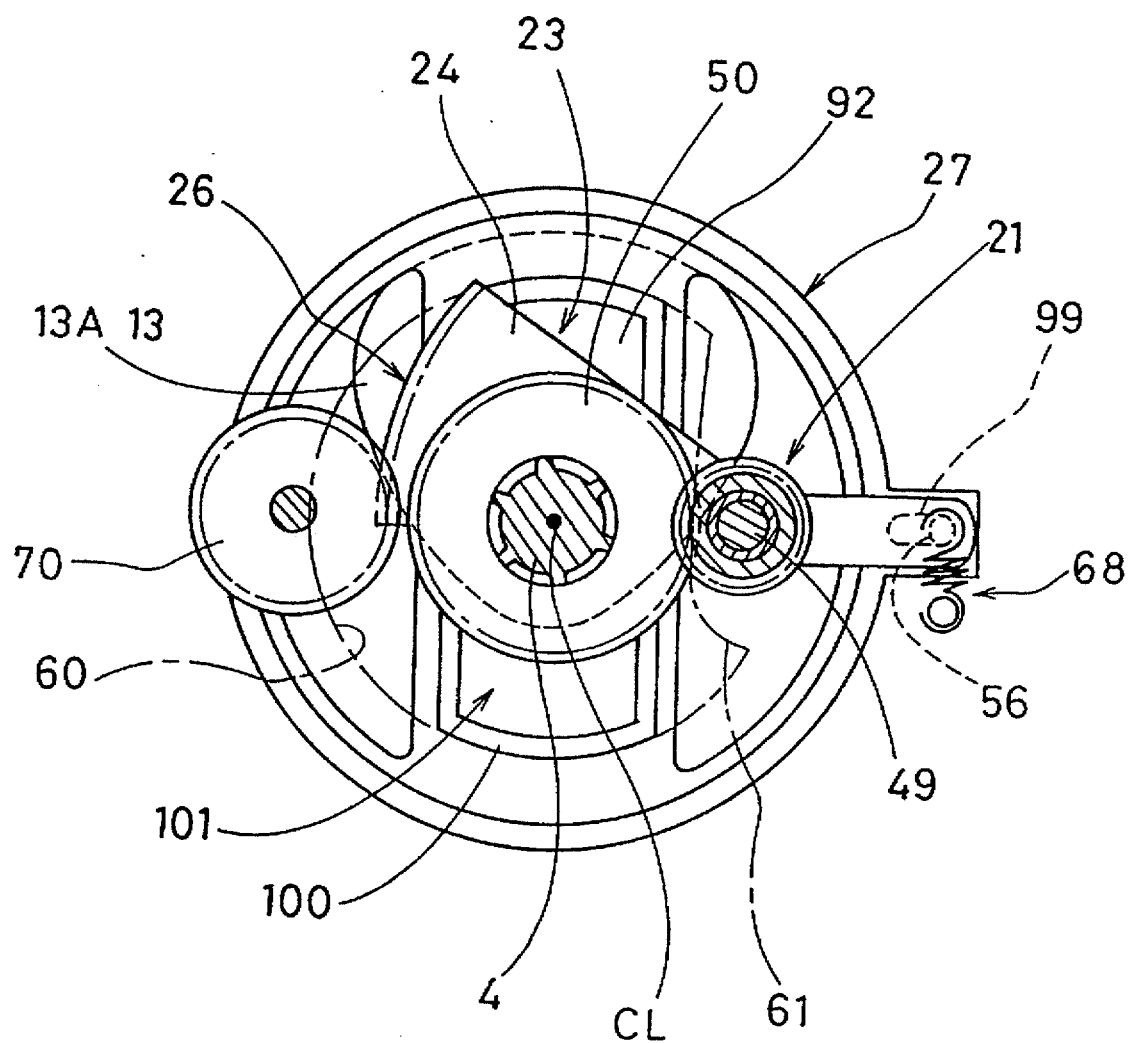
FIG. 12 is a sectional view for explaining shifting operation of a driving shaft.

During parking of the bicycle M, the swing arm 23 is in such position as shown in FIG. 12, when it is viewed from a side of the sprocket 43. In such condition, a center of the driving shaft 4 and the rotational center line CL of driven case 2 are positioned coaxially.

In order to advance the bicycle M, the pedal P is rotatably operated. A torque applied to the pedal P is transmitted through the chain C to the sprocket 43. The input torque effects for rotating the sprocket 43 clockwise.

The input torque is also transmitted to the Counter gear 21. However, in order to rotate the driving gear 50 from the parking condition of bicycle M, a high torque is required.

The counter gear 21 is subjected to the input torque and a reaction force caused by a high load of the driving gear 50, and effects for rotating the rotating frame 22 counterclockwise. However, the rotating frame 22 is restricted against being rotated counterclockwise by the one-way engagement clutch 30.

Although the friction clutch 73 provides a resistance to a swinging motion of the swing arm 23, the resistance force is set at a level lower than a torque (hereinafter referred to as a loading torque) required for initiating rotation of the driving gear 50.

Therefore, in the case a torque caused by the input torque overcomes the resistance of friction clutch 73, the counter gear 21 is rotated integrally with the driving gear 50 (driving shaft 4) on the rotating frame 22 that is retained stationarily. The rotating direction is counterclockwise about the pin 49.

As clearly recognized, the swing arm 23 also swings counterclockwise about the pin 49 (from a position shown in FIG. 12 to that in 13). The swinging motion is a swing-separating motion for separating and shifting the driving shaft 4 from the rotational center line CL. The swing arm 23 rotates the supplemental plate 27 counterclockwise by means of the engagement pin 56. Further, the swing arm 23 elongates the spring 68.

Figure 13:
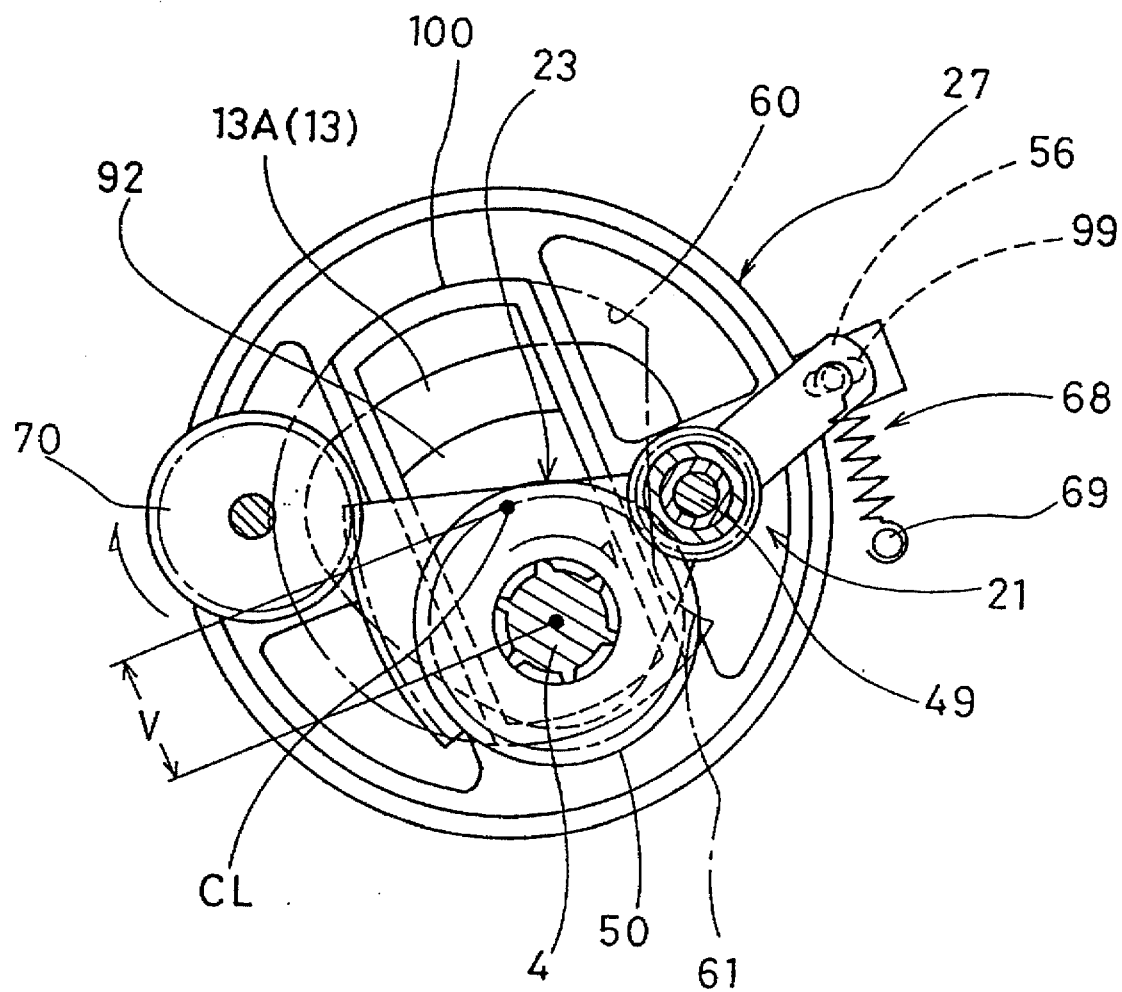
FIG. 13 is a sectional view for explaining shifting operation of a driving shaft.

As shown in FIGS. 12 and 13, the driving shaft 4 is guided by the guide frame 100 of supplemental plate 27 in rotation (and the guide frame 104 of mounting plate 17), and moved through a distance V in the direction perpendicular to the rotational center line CL. In other words, the driving shaft 4 is decentered from the rotational center line CL. The supplemental plate 27 and mounting plate 17 help the decentering operation to be smoothly taken place.

In such operation, the supplemental plate 27 interrupts the rotation by allowing the guide frame 110 to be in contact with the engagement convex portion 61 in the circular opening 60. The cam plates 13A, 13B, 13C, 13D are moved along the guide frames 100 and 104 of the supplemental plate 27 and mounting plate 17 substantially to a center of the driven case 2.

The swinging motion of swing arm 23 also causes the first rotational member 70 to be rotated in the clockwise direction. In this embodiment (as shown in FIG.8), the torque brings about counterclockwise rotation of the rotating shaft 76 by means of the gear 75.

The unidirectionally rotating cam 71 transmits the torque to the second rotational member 72. A torque of the second rotational member 72, in turn, is transmitted to the friction clutch 73. Therefore, a resistance force is active to the swing-separating motion of swing arm 23. The resistance force is preferred in that frequent swing-separating motion of the swing arm 23 by a low input or any change of an input is prevented.

In the case the input torque exceeds the loading torque, the driving gear 50 (driving shaft 4) is rotated clockwise in the eccentric position. In this way, the pinion 12A comes in engagement with one of the pair of rack gears 10.

Figure 14:
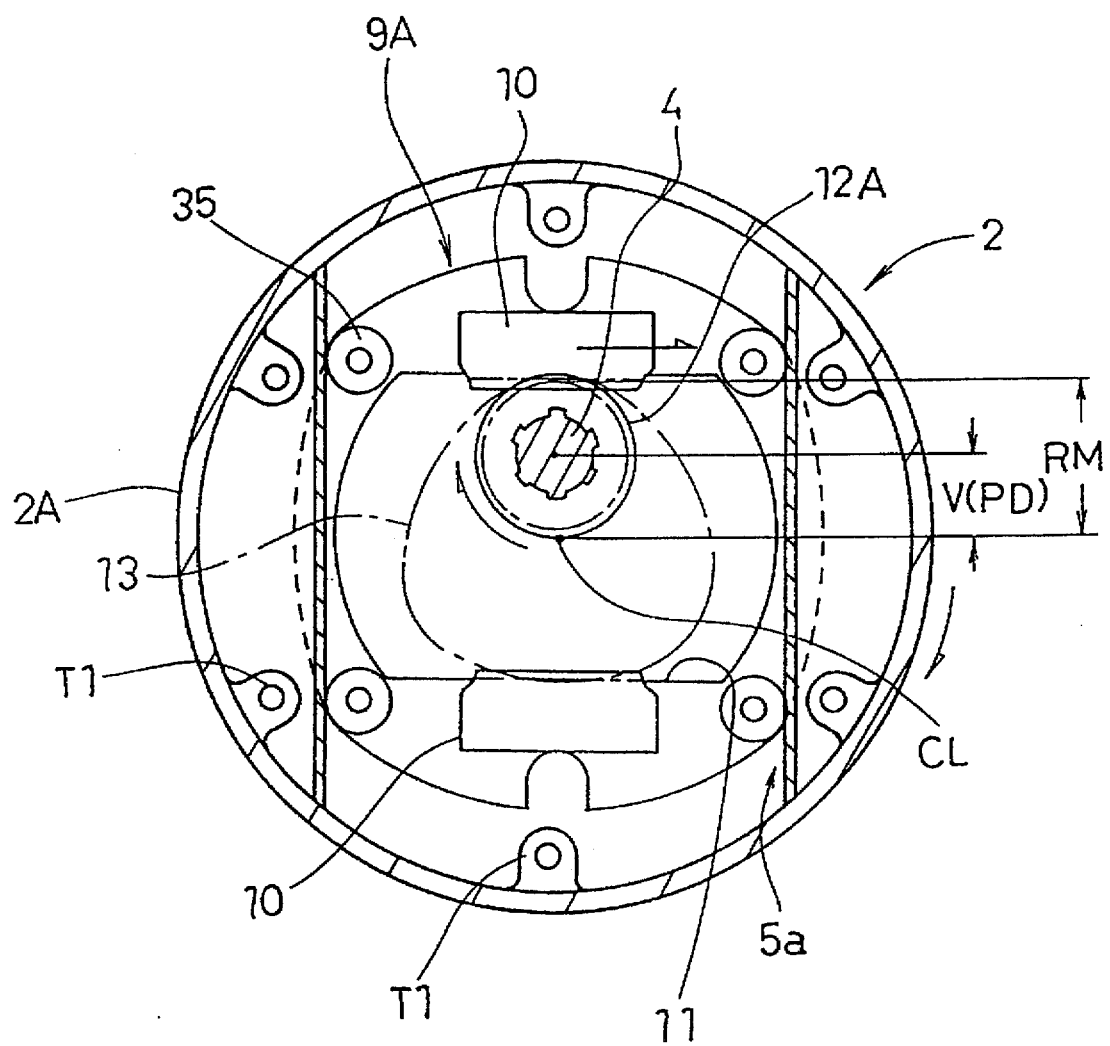
FIG. 14 is a sectional view showing a relation between a pinion 12A and a sliding frame 9A.

As shown in FIG. 14, the pinion 12A rotated in the clockwise direction presses the rack gear 10 engaged therewith toward the pitch line (shown in the figure). The sliding frame 9A is prevented from being moved toward the pitch line of rack gear 10 by the rail 5(5a). The sliding frame 9A is also prevented from being moved in the direction perpendicular to the pitch line by the cam plate 13A. The sliding frame 9A is, therefore, rotated about the cam plate 13A by the rack gear 10.

The sliding frame 9A applies a clockwise torque (shown in the figure) about the rotational center line CL to the driven case 2 by means of the rail 5(5a).

Here, one of the rack gears 10 can be brought into continuous engagement in a pitch line over an angle of 60 (deg.) of rotation of the driven case 2, in the embodiment. After the engagement is released, when the driven case is rotated 120 (deg.) the other rack gear 10 of the pair comes into engagement with the pinion 12A.

Thus, the pair of rack gears 10 are brought into engagement with the pinion 12A, respectively, for 180 (deg.) of the driven case 2. The pair of rack gears 10 provide a sum of engagement angles of 120 (deg.) for a rotation of the driven case 2.

Three pairs of rack gears 10 (six rack gears in total) are provided in the embodiment. Three pairs of rack gears 10 are angularly positioned at 120 (deg.) from each other. Therefore, three pairs of rack gears 10 provide a sum of engagement angles of 360 (deg.) for a rotation of the driven case 2. The pinions 12A, 12B, 12C are also sequentially engaged with the rack gears 10 each time the driven case 2 is rotated 60 (deg.).

It means that engagement is established at least in a set of pinion 12 and rack gear 10 during a rotation of the driven case 2. Each of the rack gears serves for about 60 (deg.) of the driven case 2, in the embodiment. The operation is achieved as if a virtual internal gear is present.

Such change gear system 1 causes no irregular rotation, and is advantageous for assuring transmission of a torque.

Figure 15:
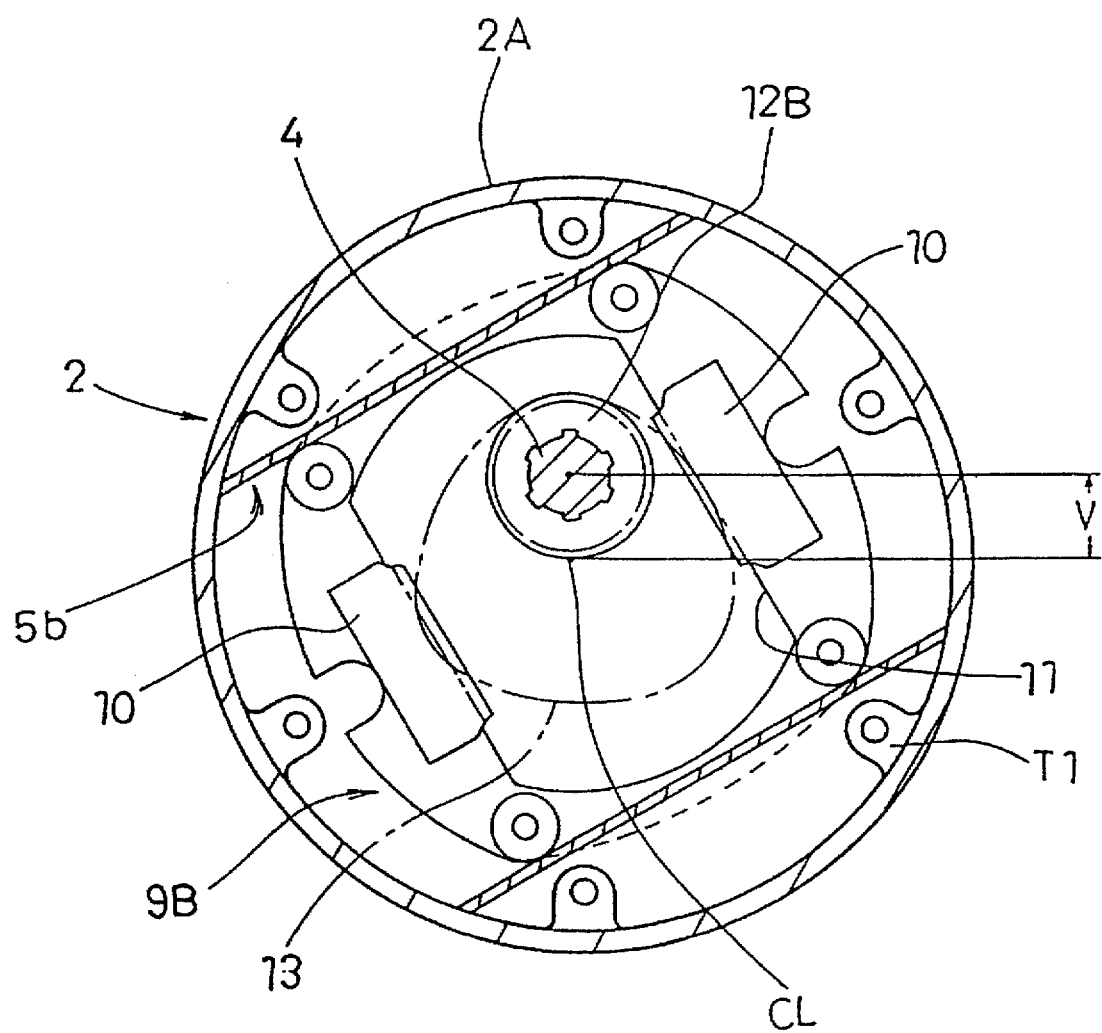
FIG. 15 is a sectional view showing a relation between a pinion 12B and a sliding frame 9B.
Figure 16:
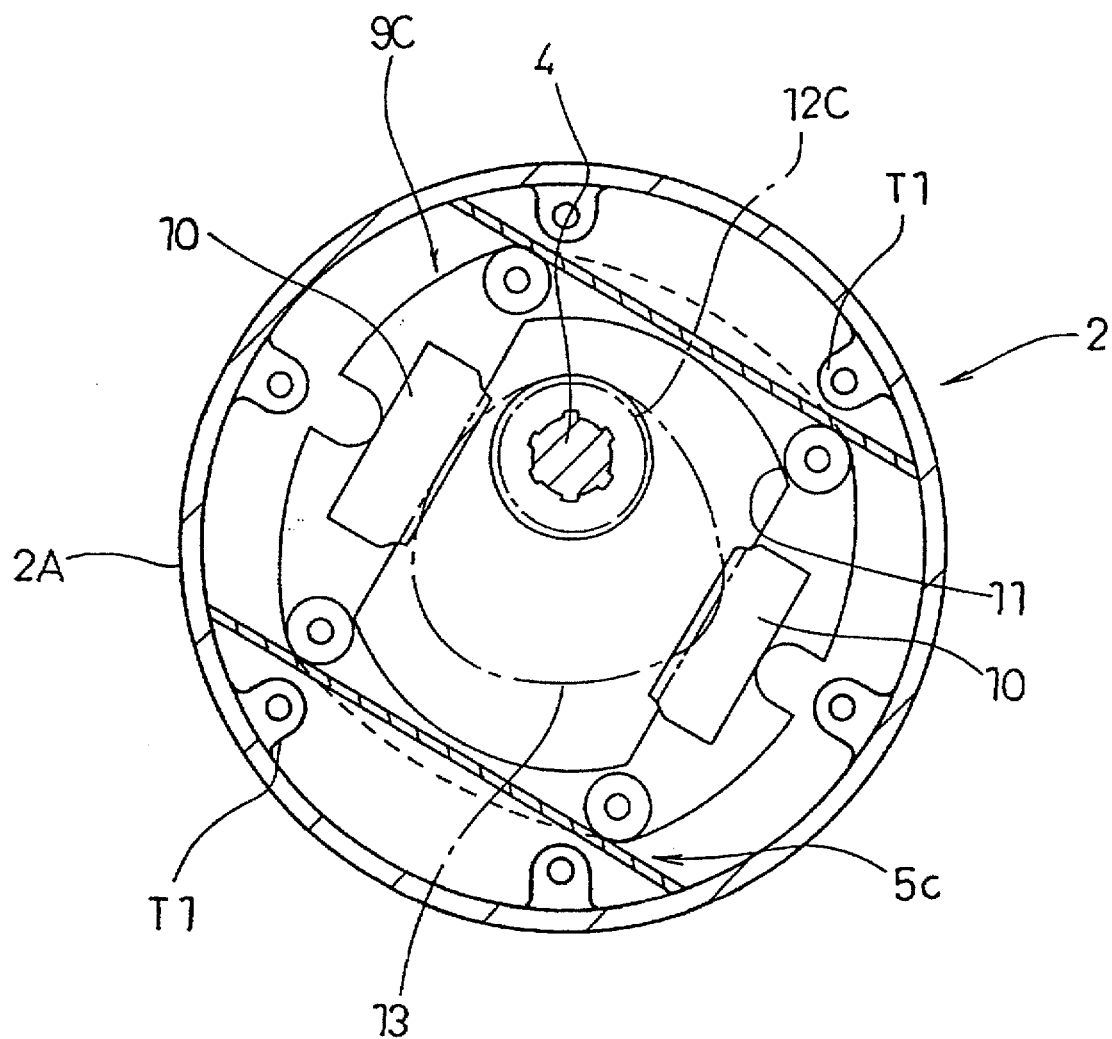
FIG. 16 is a sectional view showing a relation between a pinion 12C and a sliding frame 9C.

In FIGS. 14, 15 and 16, a relative position of the pinions 12A, 12B, 12C and the rack gears 10 is shown. They are overlaid, and shown in a virtual line in FIG. 17. The rack gears 10 are distinguished by adding alphabetic characters A, B and C in correspondence with the sliding frames 9A, 9B and 9C.

Figure 17:
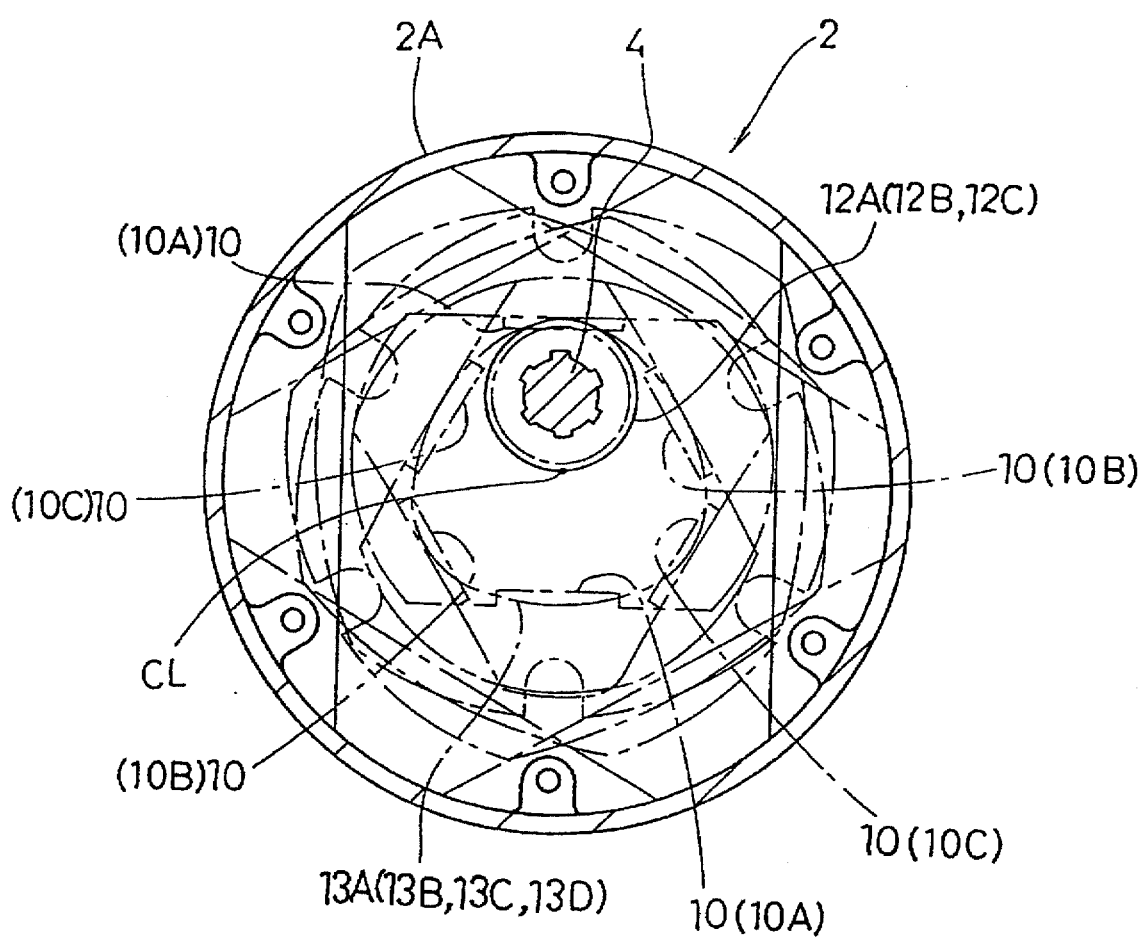
FIG. 17 is a virtual sectional view with FIGS. 13 to overlaid by each other.

As clearly recognized in FIG. 17 showing an overlaid plan view, the three pairs of rack gears 10A, 10A, 10B, 10B, 10C, 10C serve as a virtual internal gear centered about the rotational center line CL along an outer circumference of the cam plate 13 that is in a stationary condition. It is appreciated that the rack gears 10A, 10B, 10C are sequentially brought into engagement with the pinions 12A, 12B, 12C. Pitch lines of the rack gears 10 are intersected by each other at an angle of 120 (deg.) (a larger angle is measured for the angle of intersection). Accordingly, the rear wheel 32 is rotated by the driving case 2, and the bicycle M advances.

At start-up of the bicycle M, a rotating speed of the driven case 2 generally corresponds to a rotating speed of the driving shaft 4 reduced by the reduction ratio Rr. The reduction ratio Rr is expressed by Formula (1) below.

$$Rr = PD/RM \quad (1)$$

(where PD (mm) is a radius of pitch circle of the pinion 12, and RM (mm) is a distance from the rotational center line CL to a position of engagement between the pinion 12 and the rack gear 10.)

In such manner, when the bicycle M is started up for advance, the change gear system 1 automatically effects for speed change by shifting the driving shaft 4. In such speed change, the distance RM is increased, and an input torque results in a high output torque. Such speed change is the most preferable for start-up of a bicycle.

After the bicycle M is started up, a rotating speed of the driven case 2 may exceed that of the driving shaft 4. For example, it is the case when the bicycle M goes down a slope with the rear wheel 32 running idle. In such case, a loading torque of the driven case 2 is reduced up to nil.

When the loading torque of the driven case 2 is reduced, the driving gear 50 rotates the counter gear 21 in the clockwise direction according to the reduction of the loading torque and a difference of rotating speed. Such operation of the driving gear 50 is associated with a clockwise swinging motion of the swing arm 23 about the pin 49. Such swinging motion of the swing arm 23 is hereinafter referred to as "swing-restoring motion".

The swing-restoring motion is supplemented by a low restoring force of the spring 68 that is apt to be in a contracted position, and smoothly taken place without being influenced by any mechanical friction of a bearing and the like. The supplemental force of spring 68 is not particularly required for achieving the swing-restoring motion. The swing-restoring motion is independent of an input from the pedal P, and is caused totally by a load of the driven case 2.

By the swing-restoring motion of swing arm 23, the driving shaft 4 is moved in the direction of restoring from the eccentricity. In the embodiment, when the loading torque of driven case 2 is nil, the driving shaft 4 coincides with the rotational center line CL, as shown in FIG. 12.

The swing-restoring motion causes the first rotational member 70 to rotate counterclockwise. The first rotational member 70, in turn, rotates the rotating shaft 76 in the clockwise direction by means of the gear 75. Due to the unidirectionally rotating cam 71, a clockwise torque of the rotating shaft 76 is not transmitted to the second rotational member 72, leaving the rotating shaft to run idle.

As a result, the swing-restoring motion of swing arm 23 is not subjected to any resistance force of the friction clutch 73. Thus, the swing arm 23 is subjected to the low supplemental force of spring 68, and smoothly moved toward an original position.

The resistance means 25 provides with the resistance force to the swing arm 23 only at the time of shifting for a lower speed. Therefore, the change gear system 1 according to the invention can be prevented frequent gear shifting to a lower-speed side caused by change of an input torque, or a slight input and the like. Additional, shifting to a higher-speed side is achieved without being affected by the resistance force of the resistance means 25 according to a load on a driving shaft 4.

In the driving shaft 4, as the eccentricity V is reduced, the distance RM from the rotational center line CL to a position of engagement between the rack gear 10 and pinion 12 is also reduced. Here, the radius PD of pitch circle of the pinion 12 is constant. Therefore, as the distance RM is reduced, the reduction ration Rr shown in Formula (1) is accordingly increased. As a result, such preferable gear-change (change up) is achieved that a rotating speed of the rear wheel 32 of bicycle M is increased by input torque from the input cylinder 20, and the bicycle is accelerated.

In a conventional change gear system for bicycles, it is required for a rider to intentionally operate a lever to mechanically change engagement of gears. On the contrary, in the change gear system 1 according to the invention, the reduction ratio is automatically changed according to a variation in the loading torque to the rear wheel 32.

The eccentricity V of driving shaft 4 is nil at the lowest. In such case, because the radial distance RM is identical with the radius PD of pitch circle of the pinion 12, the reduction ratio Rr is generally at about "1". Then, the pinion 12 and cam plate 13 are integrally rotated clockwise about the rotational center line CL.

Figure 18:
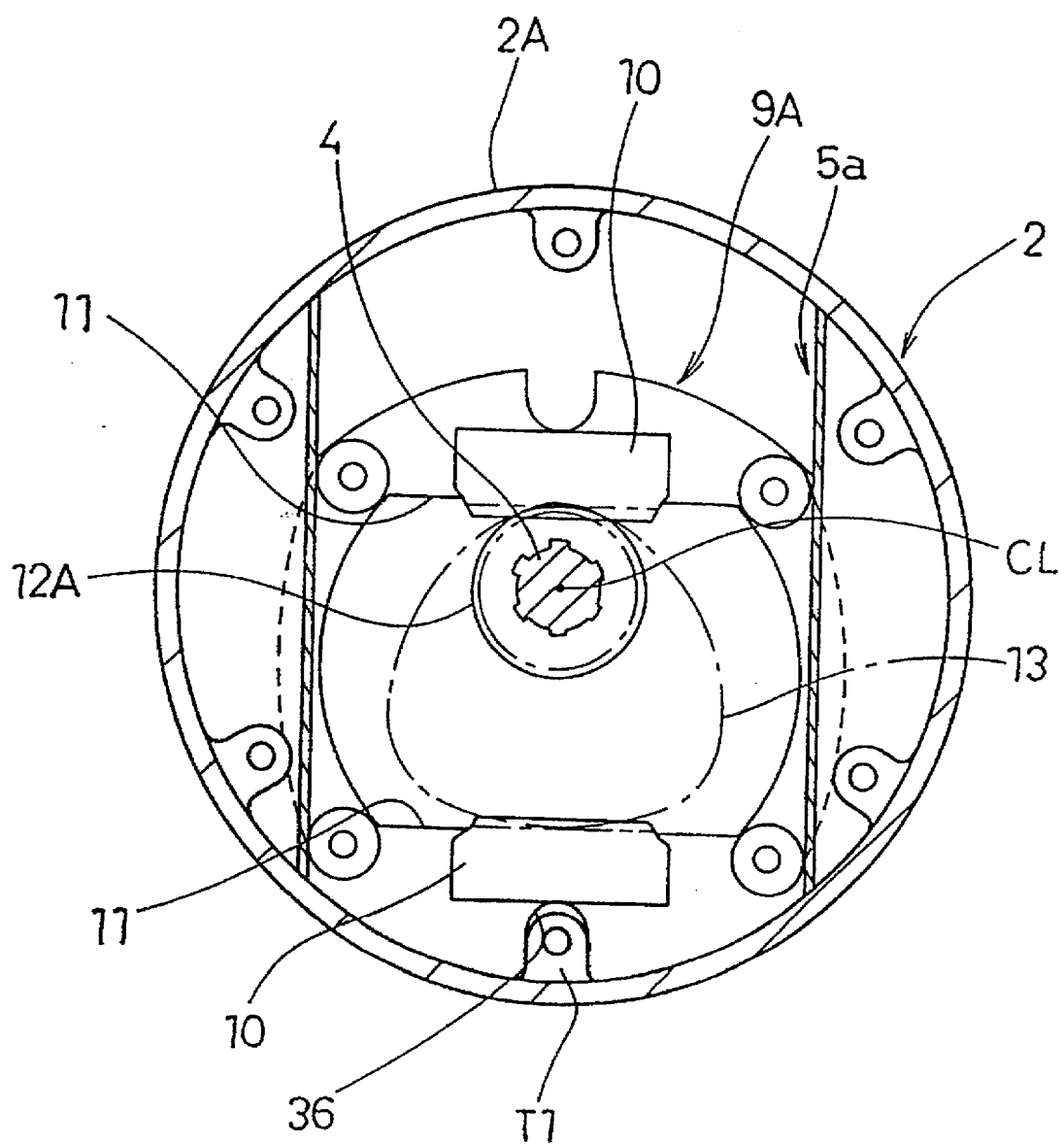
FIG. 18 is a sectional view showing a relation between a pinion 12A and a sliding frame 9A.
Figure 19:
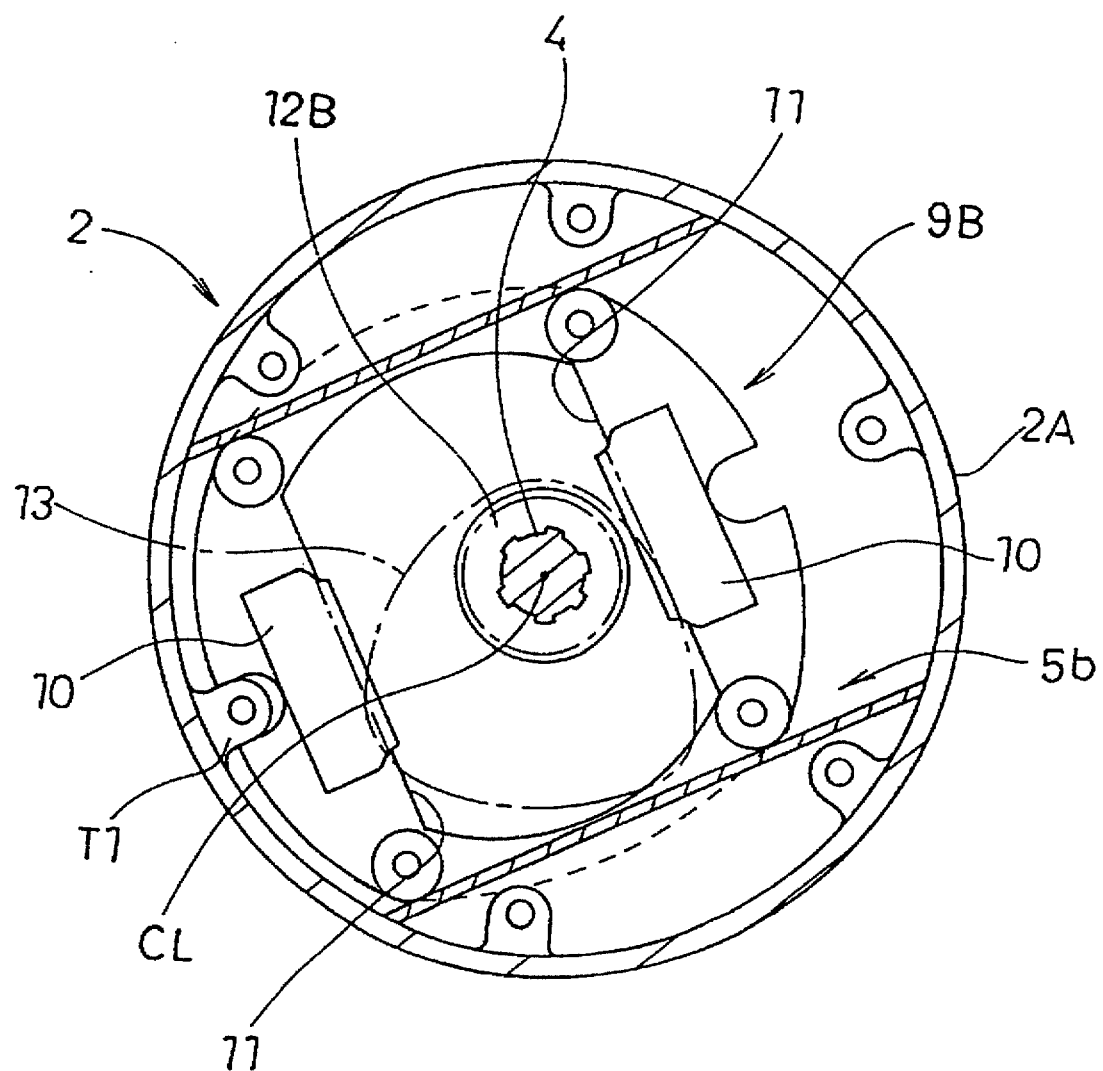
FIG. 19 is a sectional view showing a relation between a pinion 12B and a sliding frame 9B.
Figure 20:
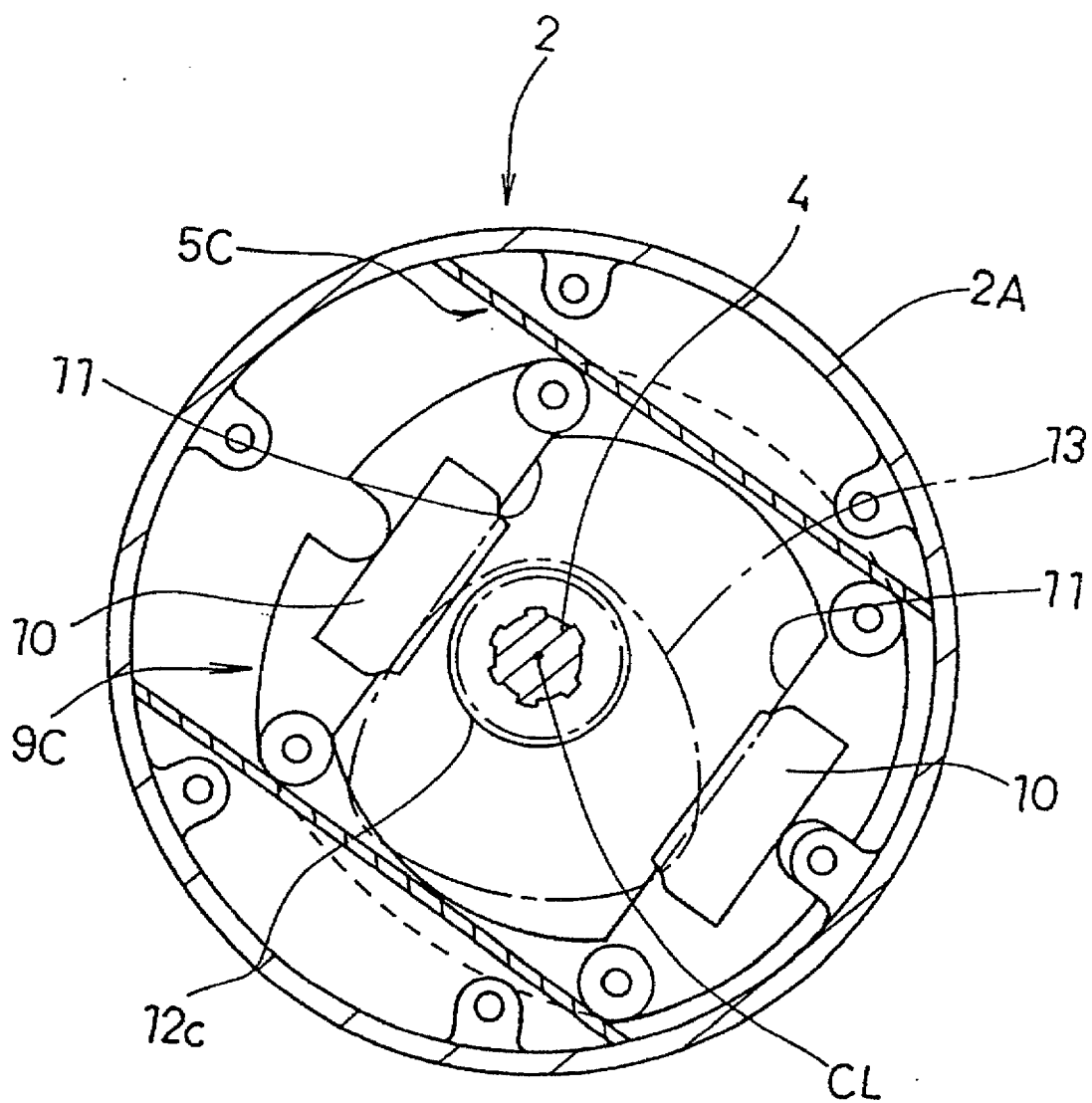
FIG. 20 is a sectional view showing a relation between a pinion 12C and a sliding frame 9C.
Figure 21:
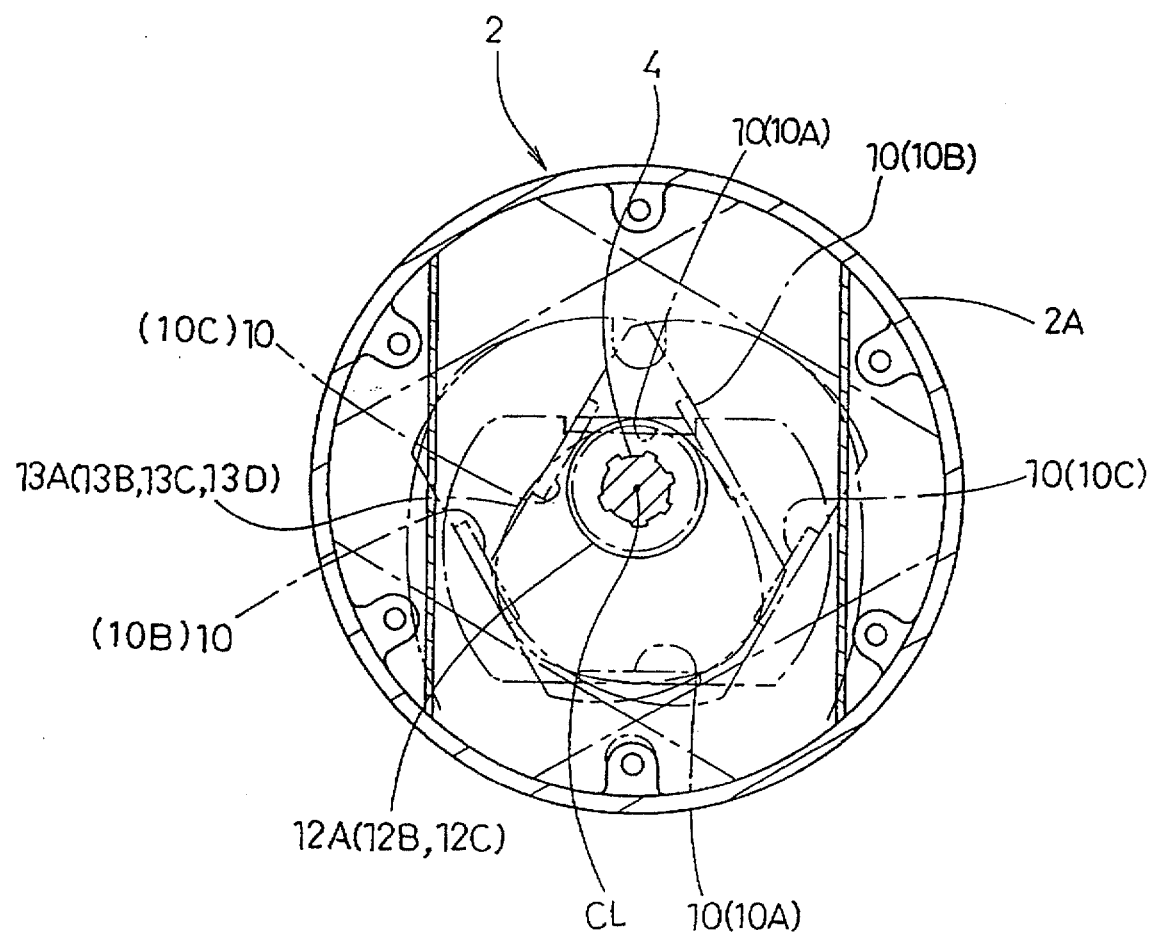
FIG. 21 is a virtual sectional view with FIGS. 17 to 19 overlaid by each other.

In FIGS. 18, 19 and 20, a relative position of the pinions 12A, 12B, 12C and rack gears 10 at the time of top-gear condition are shown. In FIG. 21, they are overlaid, and shown by a virtual line. The rack gears 10 are distinguished by adding alphabetic characters A, B and C in correspondence with the sliding frames 9A, 9B and 9C to which they are attached.

As obviously shown in FIG. 21, the rack gear 10A is rotated integrally with the pinion 12A as it is engaged therewith. In such condition, the rotating frame 22 is also rotated clockwise. The cam plates 13A, 13B, 13C, 13D are guided by the supplemental plate 27, and rotated in a similar manner.

In the embodiment, six rack gears 10 are provided in total. The pinions 12 and rack gears 10 are smoothly engaged with each other. Six rack gears 10 serve as a virtual internal gear. It will be appreciated from the description that the virtual internal gear operates as if a pitch circle is changed, as the driving shaft 4 is shifted.

In the embodiment, when the pinion 12 has twenty-four teeth, and a module(=reference pitch/pi) is used, the virtual internal gear provides approximately fifty-four teeth when the pitch circle is the largest. In such condition, the number of teeth of the virtual internal gear more smoothly engaged with the pinion 12 is reduced by multiples of six. The eccentricity V is shown in parentheses. Teeth of the virtual internal gear:teeth of the pinion 54:24 (V=15 mm)
48:24 (V=12 mm)
42:24 (V=9 mm)
36:24 (V=6 mm)
30:24 (V=3 mm)
24:24 (V=0 mm)

In the embodiment, although the reduction ratio Rr is variable within a range of about 0.444 to 1.000, it is preferably at the following value (an approximate value).

Rr=0.444
Rr=0.500
Rr=0.571
Rr=0.667
Rr=0.800
Rr=1.000

Figure 23:
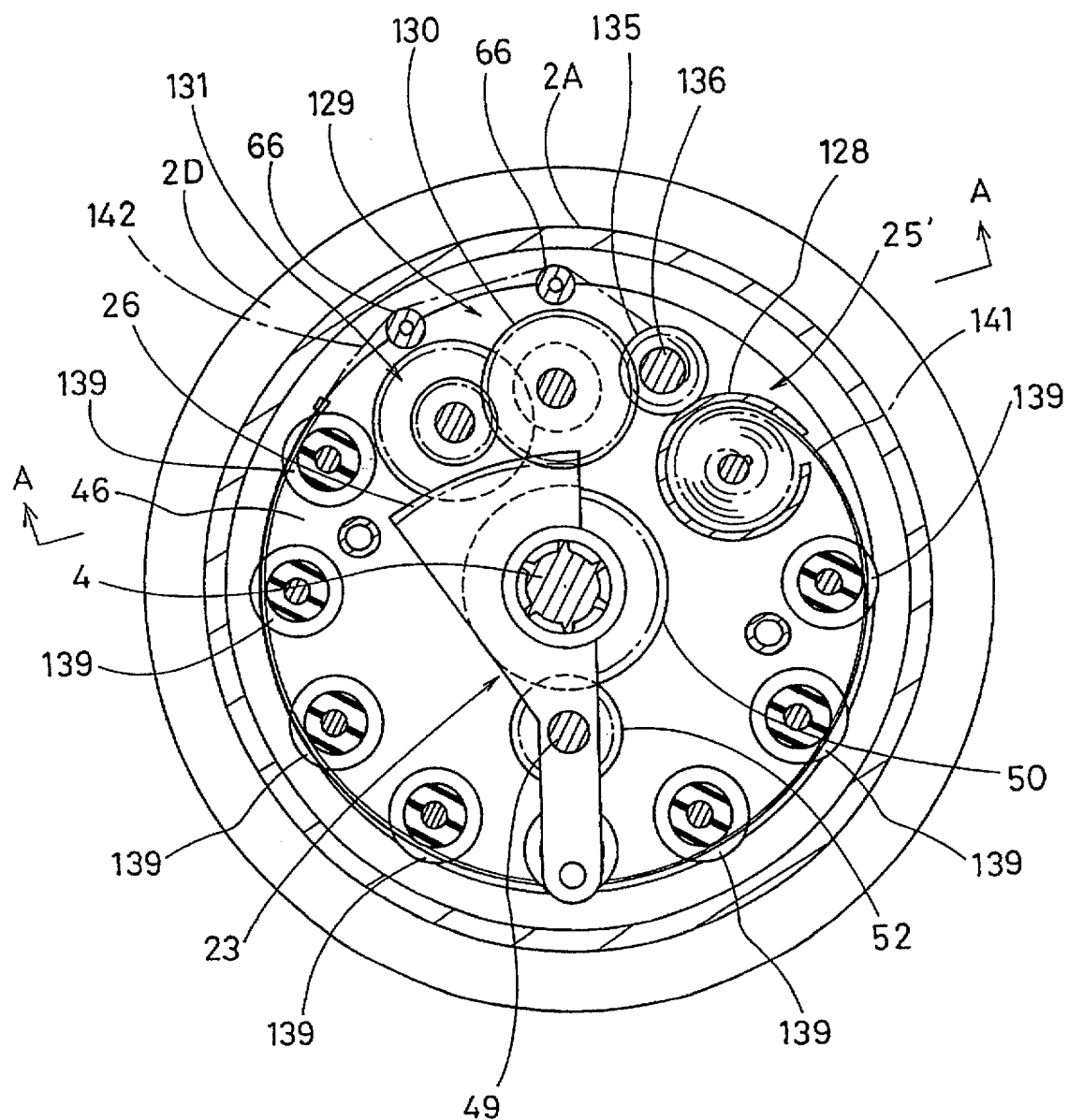
FIG. 23 is a sectional view showing another embodiment of a change gear system according to the invention.
Figure 24:
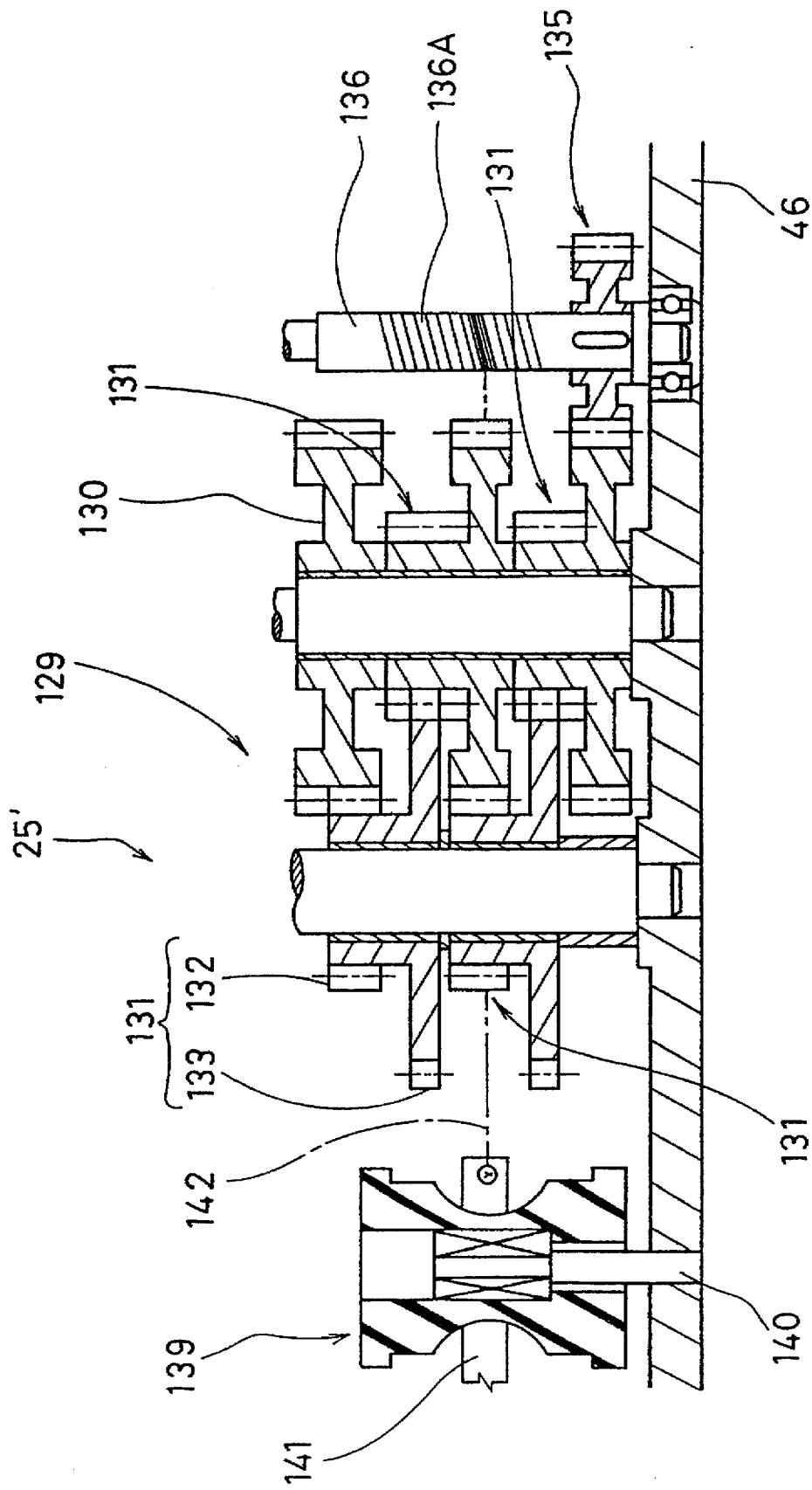
FIG. 24 is a sectional view showing the other embodiment of a change gear system according to the invention.

Now, the other embodiment of the invention is described. In FIGS. 23 and 24, the other example of resistance means 25' is shown. The resistance means 25' is provided with a spring means for pulling the swing arm 23 in such direction that it is restored from the swing-separating motion. The spring means preferably provides a constant restoring force.

The spring means may be a coil spring, spiral spring, leaf spring or other various springs. In the embodiment, a spiral spring 141 of a constant load is employed. However, the spring means is not limited thereto.

The spiral spring 141 of a constant load is formed to provide a constant curvature when it is free from any load, and housed in a spring case 128. FIG. 23 is a sectional view from a side of the brake drum BD. FIG. 24 is a sectional view along a line A—A of FIG. 23.

The spiral spring 141 of a constant load exerts a substantially constant restoring force regardless of an extent the spring is pulled out of the spring case 128. The spring case 128 is firmly fixed to the outer cover 46. The spiral spring 141 of a constant load, which is pulled out of the spring case 128, is connected to a rotating axis 136 by means of a wire 142.

The rotating shaft 136 is provided with a spiral groove 136A, and winds the wire 142 through rotation. The rotating shaft 136 is also provided with a gear 135 integrally fixed thereto by means of keying or the like. The gear 135 is linked with the gear portion 26 of the swing arm 23 through a gear train 129.

The gear train 129 amplifies the swinging motion of swing arm 23, and transmits it to the gear 135. The gear train 129 comprises in combination of a gear 130 and four gears 131.

The gear 130 is engaged with the gear portion 26 of the swing arm 23. The gear 130 is also engaged with a small gear portion 132 of the gear 131. The gear 131 integrally forms the small gear portion 132 and a large gear portion 133. The swinging motion of swing arm 23 is amplified, for example, to 120 times by sequential engagement of such gears 131.

The gear train 129 also serves as a resistance to the swing arm 23. As a result, an abrupt restoring motion of the swing arm 23 can be prevented. A plurality of rotatable guide rollers 139 are annularly provided in the outer cover 46. The guide rollers 139 smoothly guide the spiral spring 141 of a constant load in motion.

Now, operation of the embodiment is described. The swing-separating motion of swing arm 23 causes the gear 130 to be rotated clockwise (counterclockwise in FIG. 23). By the rotation of gear 130, the rotating shaft 136 is rotated counterclockwise (clockwise in FIG. 23) at a higher speed through the gear train 129.

The rotating shaft 136 winds the wire 142, and pulls, at the same time, the spiral spring 141 of a constant load out of the spring case 128. Thus, a restoring force is effective in the spiral spring 141 of a constant load.

The restoring force of the spiral spring 141 causes the rotating shaft 136 to be rotated clockwise (counterclockwise in FIG. 23). The rotation of rotating shaft 136 is reduced by the gear train 129, converted to a higher force, and transmitted to the gear 130.

The gear 130 acts on the swing arm 23 to restore it from the swing-separating motion. Here, a swinging position of the swing arm 23 can be determined by the loading torque of the driving shaft 4, the output torque from the input cylinder 20 and a torque of the gear 130 caused by the spiral spring 141. For example, when a loading torque of the driven case 2 is low, it causes the restoring-swing motion of swing arm 23, and changed for top-gear (as shown in FIG. 21).

Figure 25:
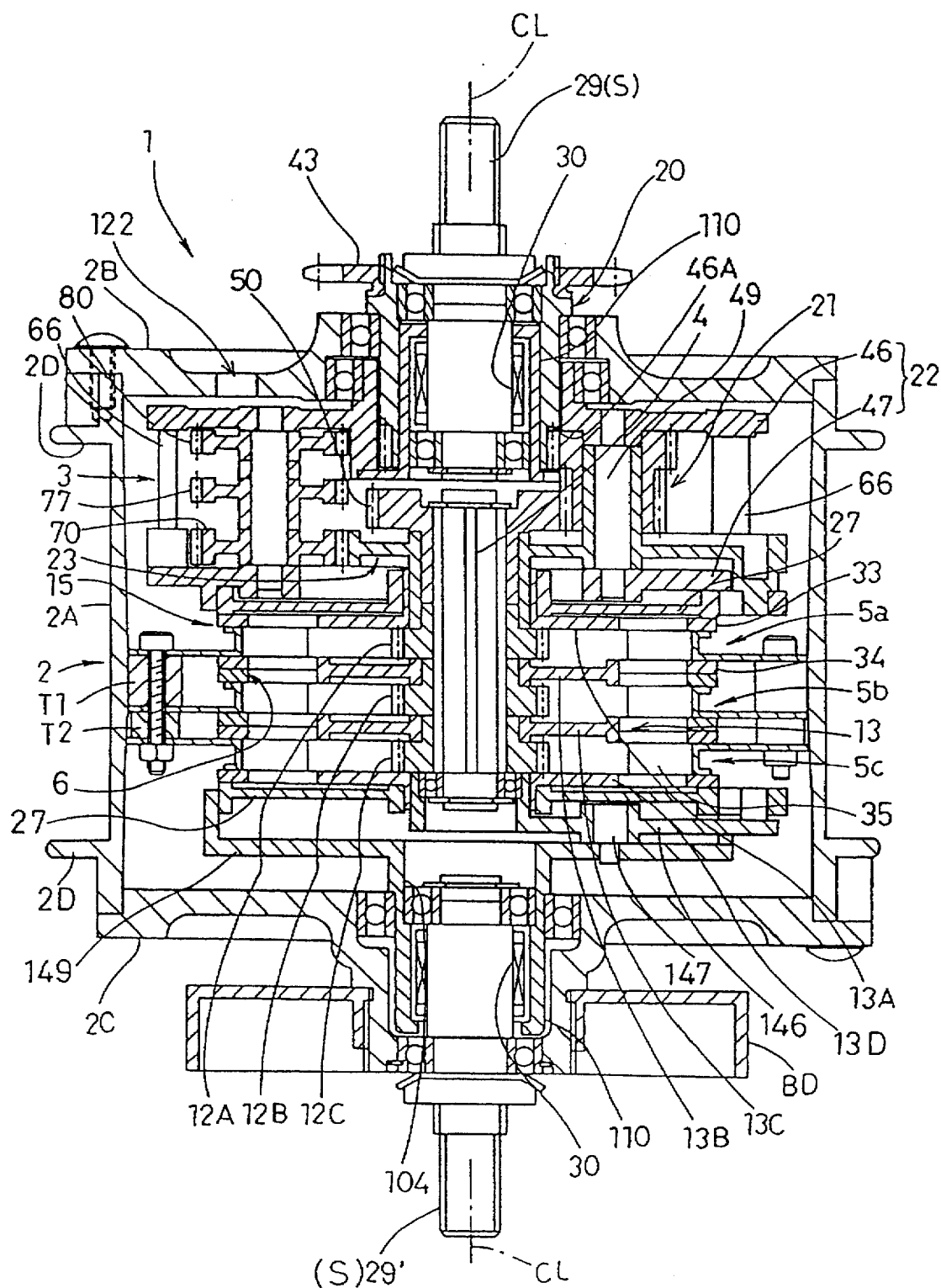
FIG. 25 is a sectional view showing a further embodiment of a change gear system according to the invention.
Figure 26:
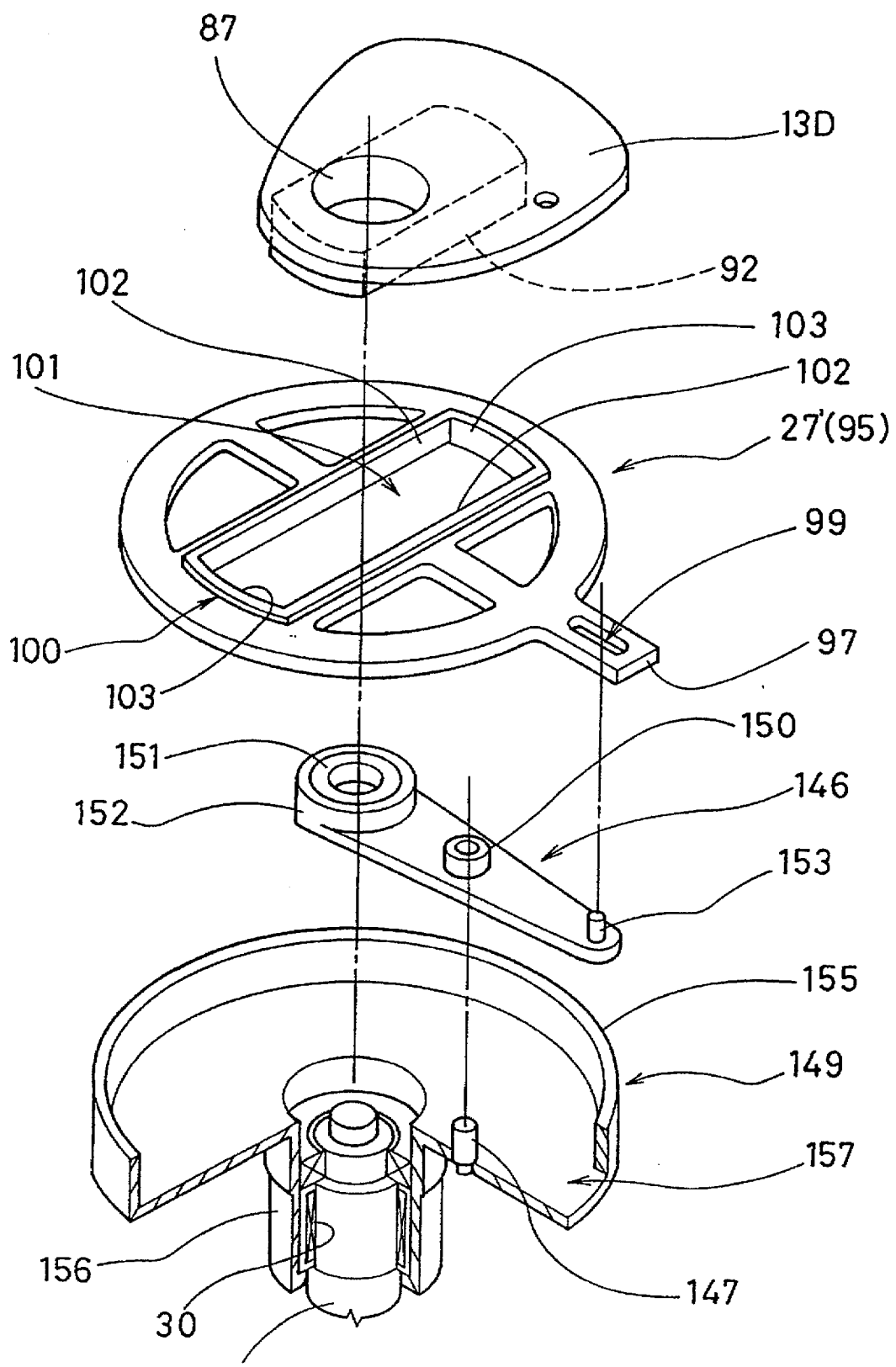
FIG. 26 is an exploded perspective view showing a still other embodiment of a change gear system according to the invention.
Figure 27:
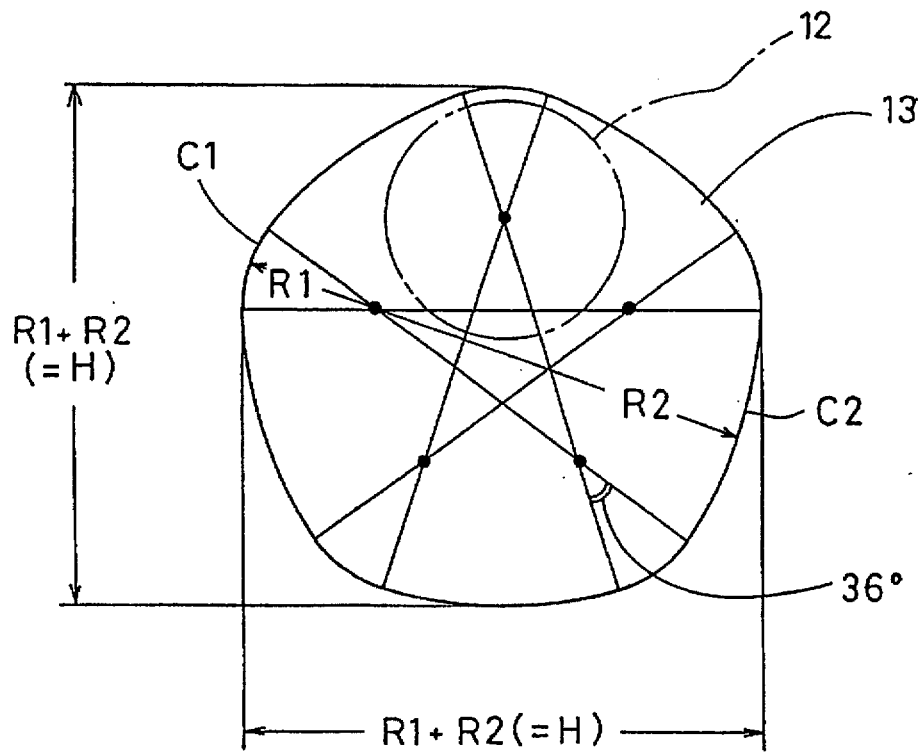
FIG. 27 is a plan view showing another embodiment of a cam plate.
Figure 28:
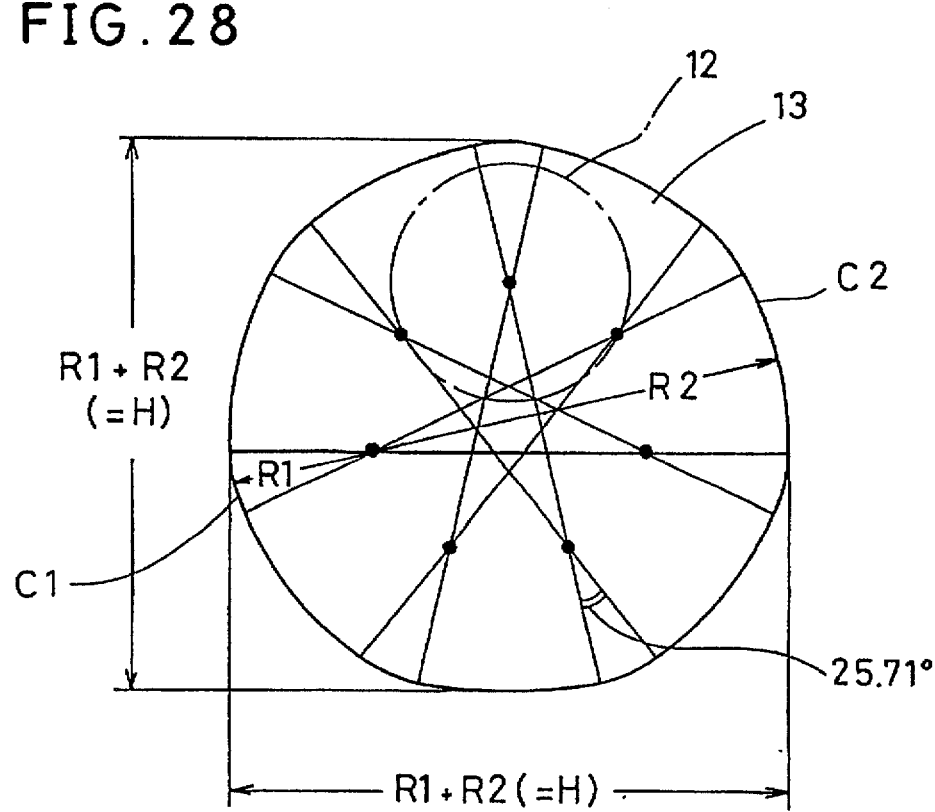
FIG. 28 is a plan view showing the other embodiment of a cam plate.
Figure 29:
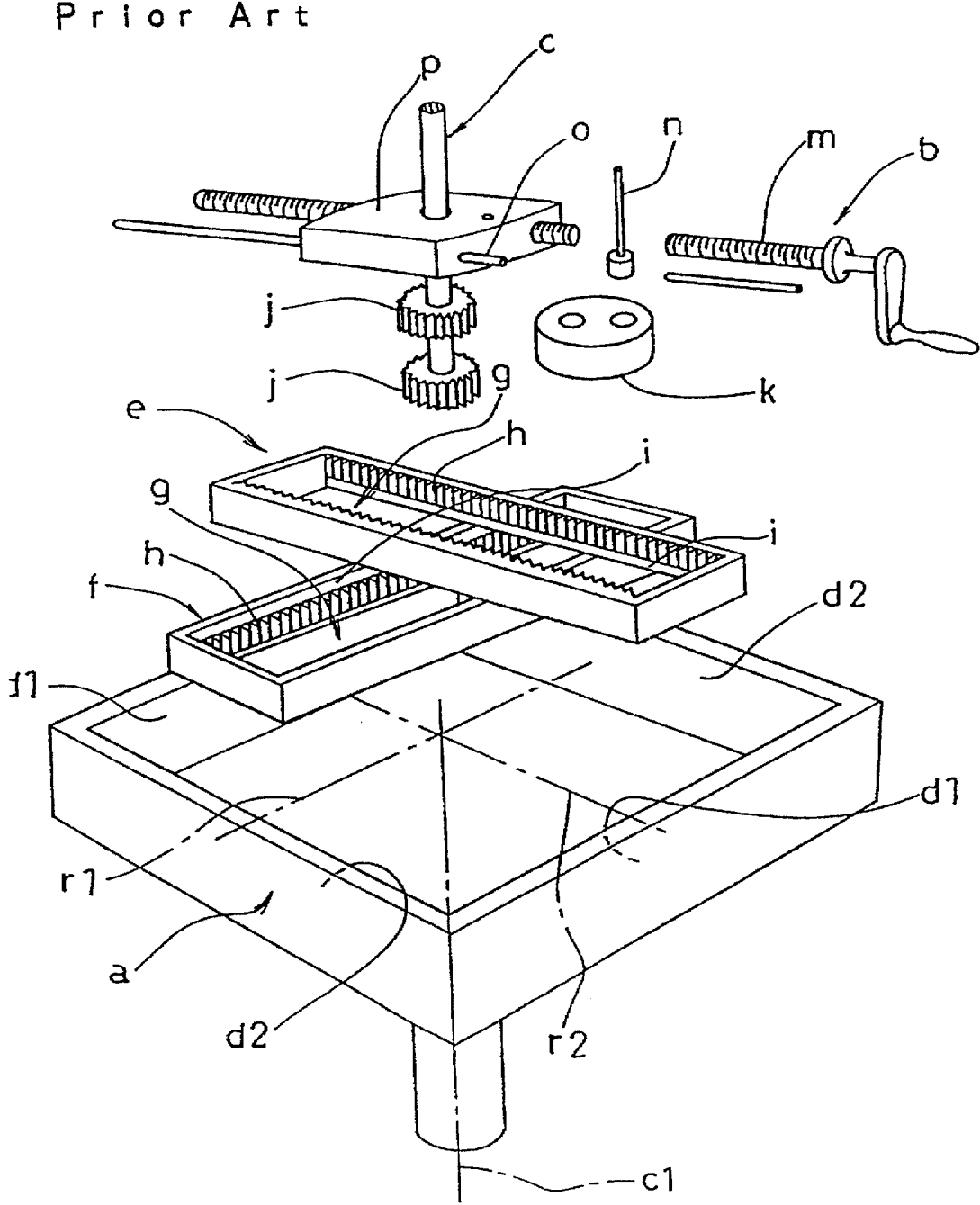
FIG. 29 is a perspective view showing a conventional change gear system.

By referring to FIGS. 25 and 26, the other mode of carrying out the invention is described. The embodiment is characterized in that a supplemental swing arm 146 and a supplemental plate 27' are additionally provided in a lower part of the driving shaft 4 in FIG. 25. The supplemental plate 27' is arranged generally similar to that of the beforementioned the supplemental plate 27(shown in FIG.3). It is, therefore, not described here.

The supplemental swing arm 146 has a boss 150 serving as a supporting point of swing motion, as shown in FIGS. 25 and 26. The boss 150 is rotatably supported by a pin 147 of mounting plate 149. The pin 147 is positioned coaxially with the pin 49 for supporting the swing arm 23.

A receptacle cylinder 152 for rotatably supporting the driving shaft 4 is formed from the boss 150 to an end of the arm. The receptacle cylinder 152 incorporates, for example, a ball bearing 151.

From the boss 150 to the other end of the arm, an engagement pin 153 projecting toward the supplemental plate 27' is provided. The engagement pin 27 is inserted to the slot 99 in the supplemental plate 27'.

The mounting plate 149 has a cylindrical wall 155 for concentrically holding the supplemental plate 27' in the embodiment. The mounting plate 149 is integrally formed with a clutch case 156. The clutch case 156 has the one-way engagement clutch 30 in the inside thereof. Thus, the mounting plate 149 is prevented from being rotated the counterclockwise. The mounting plate 149 is formed with a notch 157 for allowing rotation of the supplemental plate 27'.

Operation of the embodiment is now described.

The swing-separating motion and swing-restoring motion of the driving shaft 4 is taken place in association with a swing motion of the supplemental swing arm 146. The swing motion of supplemental swing arm 146 also causes rotation of the supplemental plate 27'.

The driving shaft 4 is, therefore, always shifted parallel to the rotational center line CL almost without any axial flexure and displacement, because it is supported in both ends by two arms 23 and 146 swinging concentrically. Shifting of the driving shaft 4 is vertically supplemented, and the cam is moved smoothly, because the supplemental plate 27' is also provided in the side of supplemental swing arm 146.

Such operation is particularly preferable in that jamming and inadequate engagement between the pinions 12A, 12B, 12C axially aligned and the rack gears 10 can be prevented.

According to the invention, three or more odd sliding frames 9 can be provided. Correspondingly, three or more pairs of rack gears (six or more in total) can be employed. In such case, the number of rack gears 10 is two times the number of sliding frames. Preferably, three, five, seven, nine or eleven sliding frames are employed. More preferably, the number of sliding frames should be three, five, seven or nine, even more preferably, three, five or seven. Most preferably, it should be three as in the embodiment.

A configuration of the cam plate 13 is required to be changed accordingly. In the case, five or seven sliding frames 9 are employed, the cam plate 13 is configured as shown in FIGS. 25 and 26.

In the cam plate 13 shown in FIG. 25, large arcs C2 having a radius of curvature R2 and small arcs C1 having a radius of curvature R1 are alternatingly aligned at an angle of 36 (deg.) respectively. In the cam plate 13 shown in FIG. 26, large arcs C2 having a radius of curvature R2 and small arcs C1 having a radius of curvature R1 are alternatingly aligned at an angle of about 25.71 (deg.) respectively. The cam plate 13 is generally more circular as the number of sliding frames 9 is increased.

Thus, an angle of intersection between pitch lines of the rack gears 10 that are virtually overlaid by each other is increased, and engagement with the pinions 12 is more smoothly achieved. For example, the angle of intersection between pitch lines of the rack gears is at 144 (deg.) in the case of five sliding frames 9, and it is about 154.3 (deg.) in the case of seven sliding frames 9.

The number of pinions 12 is increased according to the number of sliding frames 9. In the case of nine sliding frames 9, large and small arcs are alternatingly aligned at an angle of 20 (deg.) respectively, although it is not shown in the figure.

Although the invention has been described in detail above, it is not limited to the embodiments. The shifting means 3 of all embodiments, for example, can be provided with a shock absorber or the like. It is preferred in that the swing arm 23 is slowly operated by the shock absorber or the like.

The invention can be carried out in other different modes without departing from the spirit of the invention. Alternatively to bicycles, a change gear system according to the invention can be employed in various mechanical tools, motorcycles, vehicles and the like. All modifications and changes within equivalents of the claims shall be included in the invention.

What is claimed is:

1. A change gear system comprising:
    a driven case rotatably supported by a stationary member, a driving shaft parallel to a rotational center line of the driven case and shifting means for shifting a driving shaft in the direction perpendicular to the rotational center line,
    wherein a plurality of rails fixed inside the driven case and a plurality of sliding frames guided by the rails for movement are provided in alignment along the rotational center line,
    each sliding frame has an opening for receiving the driving shaft, a pair of parallel rack gears with teeth facing each other, and cam surfaces facing each other in parallel with a pitch line of the associated rack gear,
    the rails guide the sliding frames in the direction perpendicular to the pitch line of the rack gears in a plain perpendicular to the rotational center line,
    the driving shaft has a plurality of pinions for engagement with the rack gears and cam plates for positioning the sliding frames by coming into contact with the cam surfaces facing each other,
    the rack gears serve as a virtual internal gear by engagement with the pinions that are rotated,
    the driven case is rotated about the rotational center line by a torque of the sliding frames that are rotated about the driving shaft, and
    the reduction ratio is changed by changing a distance from the rotational center line to a position of the engagement by the shifting of the driving shaft, characterized in that:
        three or more odd numbered sliding frames are provided, and the moving directions of the sliding frames intersect each other by identical angles;
        each cam plate is configured such that small arcs C1 having a radius of curvature R1 and large arcs C2 having a radius of curvature R2 larger than that of the arcs C1 are alternatingly aligned, and a length H=R1+R2 of the cam plate is constant; and
        each cam plate is provided an the driving shaft such that a center of the pinions substantially coincides with that of one of the arcs C1.

2. A change gear system according to claim 1, wherein the pair of rack gears can be moved apart from each other, and are forced toward each other.

3. A change gear system according to claim 1, wherein the shifting means comprises rotatable input means, torque transmission means for transmitting a torque between the input means and the driving shaft, a rotating frame pivotally supporting the torque transmission means in a position different from that of the rotational center line and rotatable only in a direction about the rotatable center line, and a swing arm pivotally supported for a swinging motion in concentricity with the torque transmission means, and rotatably supporting the driving shaft in an end thereof; and the torque transmission means is rotated integrally with the driving shaft as it is subjected to a reaction force caused by a load of the driven case and an input torque from the input means, and causes a swing-separating motion of the swing arm in such direction that the driving shaft is separated and shifted from the rotational center line.

4. A change gear system according to claim 3 comprising resistance means for applying a resistance force to the swing-separating motion of the swing arm.

5. A change gear system according to claim 4, wherein the resistance means comprises:

a first rotational member rotated by the swinging motion of the swing arm, a unidirectionally rotating cam capable of transmitting only a torque of the first rotational member caused by the swing-separating motion of the swing arm, a second rotational member subjected to a torque of the first rotational member through the unidirectionally rotating cam and a friction clutch applying a resistance force to rotation of the second rotational member.

6. A change gear system according to claim 5, wherein the stationary member comprises two rigid shafts these are aligned with each other in an axial center and fixed to a body frame of a bicycle.

7. A change gear system according to claim 5, wherein the driven case is incorporated in a rear wheel of a bicycle so that it is rotated integrally with a tire.

8. A change gear system according to claim 7, wherein the input means is subjected to a torque from a pedal of a bicycle.

9. A change gear system according to claim 4, wherein the resistance means is spring means for pulling the swing arm in such direction that it is restored from the swing-separating motion.

10. A change gear system according to claim 3, wherein the swing arm allows a supplemental plate held concentrically with the rotating frame to be rotated by the swinging motion; and the supplemental plate is formed with a guide frame for guiding the shifting of the driving shaft, and help the driving shaft to be shifted through rotation thereof.

11. A change gear system according to claim 3, wherein the rotating frame is attached to the stationary member by means of a one-way engagement clutch so that it is rotated only in one direction.

12. A change gear system according to claim 1 wherein the stationary member comprises two rigid shafts these are aligned with each other in an axial center and fixed to a body frame of a bicycle.

13. A change gear system according to claim 1, wherein the driven case is incorporated in a rear wheel of a bicycle so that it is rotated integrally with a tire.

14. A change gear system according to claim 1, wherein a distance from each cam surface to a position of pitch line of the corresponding rack gear is identical with a distance from one of the arcs C1 with a radius of curvature R1 configuring each cam plate to a position of pitch line of the pinions.

* * * * *